(12) United States Patent
Loritz

(10) Patent No.: US 11,548,673 B2
(45) Date of Patent: Jan. 10, 2023

(54) STEAM SHRINK WRAP SLEEVE WITH PRINTED LABEL FOR CONTAINER AND ASSOCIATED METHOD

(71) Applicant: Kenneth Anthony Loritz, Irvine, CA (US)

(72) Inventor: Kenneth Anthony Loritz, Irvine, CA (US)

( * ) Notice: Subject to any disclaimer, the term of this patent is extended or adjusted under 35 U.S.C. 154(b) by 269 days.

(21) Appl. No.: 16/454,952

(22) Filed: Jun. 27, 2019

(65) Prior Publication Data

US 2020/0002041 A1  Jan. 2, 2020

Related U.S. Application Data

(60) Provisional application No. 62/760,770, filed on Nov. 13, 2018, provisional application No. 62/690,740, filed on Jun. 27, 2018.

(51) Int. Cl.
| | |
|---|---|
| *B65B 53/04* | (2006.01) |
| *G09F 3/10* | (2006.01) |
| *B65B 53/06* | (2006.01) |
| *B65B 61/02* | (2006.01) |

(52) U.S. Cl.
CPC .............. *B65B 53/04* (2013.01); *B65B 53/06* (2013.01); *B65B 53/066* (2013.01); *B65B 61/025* (2013.01); *G09F 3/10* (2013.01)

(58) Field of Classification Search
CPC ....... B65B 53/04; B65B 53/06; B65B 61/025; B65B 53/066; B65B 53/02; G09F 3/10
USPC ............................... 53/442, 557, 6; 432/152
See application file for complete search history.

(56) References Cited

U.S. PATENT DOCUMENTS

| | | | | |
|---|---|---|---|---|
| 3,567,551 | A | | 3/1971 | Dullinger |
| 3,778,220 | A | | 12/1973 | Ahrendt et al. |
| 3,873,655 | A | * | 3/1975 | Amberg ................ B29C 63/426 264/48 |
| 4,016,706 | A | * | 4/1977 | Braker .................. B29C 63/426 53/49 |
| 4,072,553 | A | * | 2/1978 | Braker .................... B65B 53/06 156/499 |
| 4,092,382 | A | * | 5/1978 | Heckman .............. B29C 63/423 264/342 R |

(Continued)

OTHER PUBLICATIONS

U.S. Appl. No. 16/951,484, filed Nov. 18, 2020, Loritz.
International Search Report and Written Opinion dated Feb. 9, 2021 for International Application No. PCT/US2020/061025.

*Primary Examiner* — Hemant Desai
*Assistant Examiner* — Mobeen Ahmed
(74) *Attorney, Agent, or Firm* — Fay Sharpe LLP

(57) ABSTRACT

A shrink wrapping apparatus, and associated process, includes a housing (turbine) having a wall forming a passage dimensioned to receive the associated container assembly and associated sleeve. The passage has an inlet and an outlet spaced therefrom, and the inlet is located vertically above the outlet such that the associated container assembly and associated sleeve move from the inlet toward the outlet. A steam path communicates with the passage to provide steam from an associated steam source to at least a portion of the passage in order to shrink wrap the associated sleeve on the associated container assembly as the container assembly and sleeve move downwardly through the passage and the steam naturally rises upwardly through the passage.

20 Claims, 37 Drawing Sheets

(56) References Cited

U.S. PATENT DOCUMENTS

| | | | | |
|---|---|---|---|---|
| 4,172,873 A * | 10/1979 | Spicer | ............... | B65B 53/06 |
| | | | | 156/86 |
| 4,215,460 A | 8/1980 | Amberg | | |
| 4,248,030 A * | 2/1981 | Heckman | ............ | B29C 63/426 |
| | | | | 53/442 |
| 4,325,762 A * | 4/1982 | Burmeister | ......... | B65C 3/065 |
| | | | | 156/499 |
| 4,412,876 A | 11/1983 | Lerner | | |
| 4,991,377 A * | 2/1991 | Marchesini | ........... | A61J 3/072 |
| | | | | 53/375.9 |
| 6,090,231 A | 7/2000 | Saito | | |
| 7,811,084 B2 * | 10/2010 | Huang | ............... | B29C 63/423 |
| | | | | 53/442 |
| 8,235,712 B1 * | 8/2012 | Lewis | ............... | B65D 23/0878 |
| | | | | 432/143 |
| 9,067,702 B2 * | 6/2015 | Scherl | ............... | B65C 3/065 |
| 2004/0237472 A1 * | 12/2004 | De Cardenas | ........ | B65B 61/205 |
| | | | | 53/329.2 |
| 2005/0022469 A1 * | 2/2005 | Fresnel | ............... | B65B 53/066 |
| | | | | 53/399 |
| 2009/0071107 A1 * | 3/2009 | Ehrmann | ............... | B65B 53/02 |
| | | | | 53/442 |
| 2009/0308964 A1 | 12/2009 | Chudy | | |
| 2010/0032077 A1 * | 2/2010 | Uetsuki | ............... | B65B 53/063 |
| | | | | 156/497 |
| 2010/0058715 A1 * | 3/2010 | Schilling | ............... | B65B 53/063 |
| | | | | 53/64 |
| 2014/0041341 A1 * | 2/2014 | Koolhaas | ............... | B65B 21/245 |
| | | | | 53/442 |
| 2014/0053515 A1 * | 2/2014 | Koolhaas | ............... | B65B 21/245 |
| | | | | 53/557 |
| 2015/0040520 A1 * | 2/2015 | Landolt | ............... | F28D 21/0014 |
| | | | | 53/442 |
| 2015/0217891 A1 * | 8/2015 | Whang | ............... | B65D 75/5844 |
| | | | | 53/442 |
| 2016/0083134 A1 * | 3/2016 | Vissa | ............... | B29C 63/38 |
| | | | | 219/401 |
| 2017/0225818 A1 * | 8/2017 | Lue | ............... | B65C 9/28 |
| 2019/0329922 A1 * | 10/2019 | Kato | ............... | B65B 31/06 |

* cited by examiner

STEAM SHRINK WRAP SLEEVE WITH PRINTED LABEL FOR CONTAINER AND ASSOCIATED METHOD

This application claims the priority benefit of U.S. provisional application Ser. No. 62/690,740, filed Jun. 27, 2018 and 62/760,770, filed Nov. 13, 2018, the entire disclosures of which are expressly incorporated herein by reference.

BACKGROUND

This invention relates to container assemblies, and sealing container assemblies, and particularly a container assembly of the type having a container or container body with an opening therein that provides access to a cavity formed in the container, and a cap or closure member that is preferably hingedly connected to the container, or may be a separate component that is received on or over the opening, to close or open the container and preclude/permit, respectively, selective access to the cavity.

The container and cap are preferably a polymer or plastic construction, e.g., typically a molded container assembly construction, where the container and cap are molded in the same machine when hingedly connected together, or the container and cap may be molded in separate machines when the container and cap are separate components. Once a container is filled with a desired product, and the cap closed over the container opening, it is common to also heat shrink a thin, flexible plastic sleeve over the capped container, where at least a portion of the heat shrunk sleeve extends over each of the cap and container, i.e., the sleeve shrink seals over the interface region of the cap and container. In this manner, the heat shrink sleeve serves to retain the cap in a closed condition with the container, and also the sleeve advantageously acts as a tamper evident feature for the container assembly.

Typical shrink sleeve machines are built with horizontal conveyors to feed the sleeve and tubes through the sealing process. Shrink sleeve steamer machines are bulky, expensive, hard to operate, require extensive time to set up, use large amounts of water, and are not easily adaptable to various size tubes or containers. Moreover, operation of a plastic shrink sleeve machine requires a skilled employee which adds an additional burden and cost to the employer. Careful control of the shrink sleeve operation is also required, particularly where the content or product stored in the container is sensitive to elevated temperatures. For example, elevated temperatures may cause certain types of product/content to stick to an interior surface of the container that forms the cavity.

Horizontal conveyors are commonly used and numerous steam nozzles and long process tunnels are required to process the plastic shrink sleeves, e.g., numerous seconds are required to process the containers and shrink sleeves (time that can compromise packaged products). Therefore, a careful balance is required between sufficient heat/elevated temperatures to ensure proper shrink sleeve application to the container assembly versus an extensive resident time in the shrink sleeve machine that potentially adversely impacts product stored in the container assembly.

Another problem relates to printing used on the shrink wrap sleeves applied to the container. Printing on the sleeve prior to shrink wrapping the sleeve has the potential to distort the print. Further, in some instances, the print information may not be learned until just prior to installing the sleeve to the container, e.g., a batch number is required on the sleeve, and yet the batch number is not available until just prior to application on the container. This causes the sleeve and/or container supplier to incur additional expense or handling in an effort to accommodate the last minute inclusion of this information into the print on the sleeve. One solution would be to create the sleeve with a desired design, and/or with some of the printed material that can be included on the sleeve and will not be subject to the distortion issues, or is not part of the last minute information that is required on the packaged container, i.e., the closed container sealed within the shrink wrap sleeve. Application of a label would be desirable where the last-minute information can be added just prior to packaging (i.e., shrink wrapping the sleeve to the container). The industry does not use this solution because the printed label does not work well in the high temperature steam environment of the shrink wrap sleeve applied to the container.

A need exists for an improved arrangement that provides at least one or more of the above-described features, as well as still other features and benefits.

SUMMARY

A shrink wrapping apparatus is configured to shrink wrap associated sleeves on an associated container assembly that includes an associated cap and associated container.

The shrink wrapping apparatus includes a housing (also referred to herein as a turbine) having a wall forming a passage dimensioned to receive the associated container assembly and associated sleeve. The passage is dimensioned to receive the associated container assembly with the unshrunk sleeve received thereover so that the container assembly and sleeve travel through the passage. The passage has an inlet and an outlet spaced therefrom, and the inlet is located vertically above the outlet such that the associated container assembly and associated sleeve move from the inlet toward the outlet. A steam path communicates with the passage to provide steam from an associated steam source to at least a portion of the passage between the inlet and outlet in order to shrink wrap the associated sleeve on the associated container assembly as these components pass through the passage of the shrink wrapping apparatus.

The housing preferably may further include a turning member that rotates the associated container assembly with the sleeve received thereon as the associated container assembly and associated sleeve pass through the passage.

The turning member in a preferred arrangement includes at least one protrusion such as a helical protrusion that extends from the housing into the passage and prevents the associated container assembly and associated sleeve from contacting the housing wall, and in a preferred arrangement the turning member includes multiple, helical protrusions that extend from the housing wall into the passage. In the preferred arrangement, the turning member is located in the passage between the inlet and outlet.

The steam path includes a steam inlet that communicates with a chamber in the housing wall that preferably surrounds a perimeter portion of the passage between the passage inlet and the passage outlet. More specifically, the steam path preferably includes multiple, spaced apart steam outlets that communicate with the chamber and extend through the housing wall to the passage in order to efficiently and effectively communicate steam from the associated steam source into the passage.

The apparatus preferably may further include a collector adjacent the passage outlet for directing condensate from the steam that has cooled/condensed into a liquid to a recirculation line that communicates with the associated steam source and advantageously reuses the liquid to form steam.

The apparatus preferably may further include a vibrator for imparting vibrations to the housing wall.

The housing is preferably constructed from a polymer material.

In one embodiment, the sleeve includes a region that is printed with information just prior to introduction into the shrink wrapping apparatus. For example, the sleeves are fed through a thermal printer where on-the-spot/just-in-time printing such as bar codes, batch information, sale information, compliance information, etc., is completed, and then immediately thereafter directed through the shrink wrapping apparatus where the quick advancement through the shrink wrapping apparatus has no adverse impact on the on-the-spot print.

Alternatively, a preprinted label with the just-in-time printed information is secured or applied to the sleeve just prior to introduction into the shrink wrapping apparatus. Again, due to the reduced amount of time that the sleeve is present in the passage and exposed to the steam, the label on the sleeve and also the print on the label are not adversely impacted with respect to size or print quality thereon. Likewise in those instances where a label is adhesively secured to the sleeve, the adhesive that secures the printed label to the sleeve is not adversely impacted (i.e., the label remains adhesively secured to the sleeve). Rather, the remainder of the sleeve (that surface area without the label) still undergoes the shrinking when exposed to the elevated temperature steam and then cooled, but the label maintains its original shape and size. The container assembly is still effectively sealed within the shrink wrap sleeve, the last minute information can be added to the label just prior to the shrink wrap process, and the remainder of the sleeve without the label effectively shrinks onto the container assembly.

A method of shrink wrapping sleeves on a container assembly that includes a cap and container is disclosed. The method includes providing a housing or turbine having a wall forming a passage dimensioned to receive the container assembly and sleeve, the passage having an inlet and an outlet spaced from one another. The method further includes locating the inlet vertically above the outlet such that the container assembly and sleeve move downwardly from the inlet toward the outlet. The method also includes providing steam from a steam source to a steam path that communicates with at least a portion of the passage in order to shrink wrap the sleeve on the container assembly.

The method may further include rotating the associated container assembly as the associated container assembly passes through the passage.

The method may further include extending at least one protrusion (preferably a helical protrusion) from the housing into the passage to rotate the associated container assembly.

The method further including providing at least one protrusion that extends from the housing into the passage where the at least one protrusion prevents the associated container assembly from contacting the housing wall.

The method includes collecting steam condensate or liquid and communicating the condensate through a recirculation line to the associated steam source.

The method further comprising imparting vibrations to the housing wall.

The method further comprising forming the housing of a polymer material.

The method may include providing a region on the sleeve on which on-the-spot/just-in-time printing such as bar codes, batch information, sale information, compliance information, etc., is completed. The sleeve with the just-in-time print thereon is then positioned on the container assembly and immediately the sleeve is introduced into the shrink wrapping apparatus where the steam shrinks the sleeve on to the container assembly (e.g., along the interface of the container and cap) and the just-in-time print region remains unaffected.

Alternatively, the method may include using a sleeve with a label applied or secured thereto. The label may include pre-printing and the label may be previously attached to the sleeve and supplied to the packaging station. It is also contemplated that additional printing can be added to the label just prior to the shrink wrap process so that last minute information can be included on the label. The shrink wrap sleeve does not shrink along that surface area region where the label is applied during the shrink process, while the remainder of the sleeve without any label attached thereto, will shrink on the container assembly as desired.

The present disclosure advantageously uses the fact that steam rises to its advantage.

Another benefit is associated with the significantly reduced time required to apply the shrink sleeve to accurately, effectively, and inexpensively apply the shrink sleeve to the container assembly.

Still another advantage is the reduced cost to manufacture and operate the shrink wrapping apparatus.

Other benefits and advantages of the present disclosure will become more apparent from reading and understanding the following detailed description.

DETAILED DESCRIPTION

Figure 1:
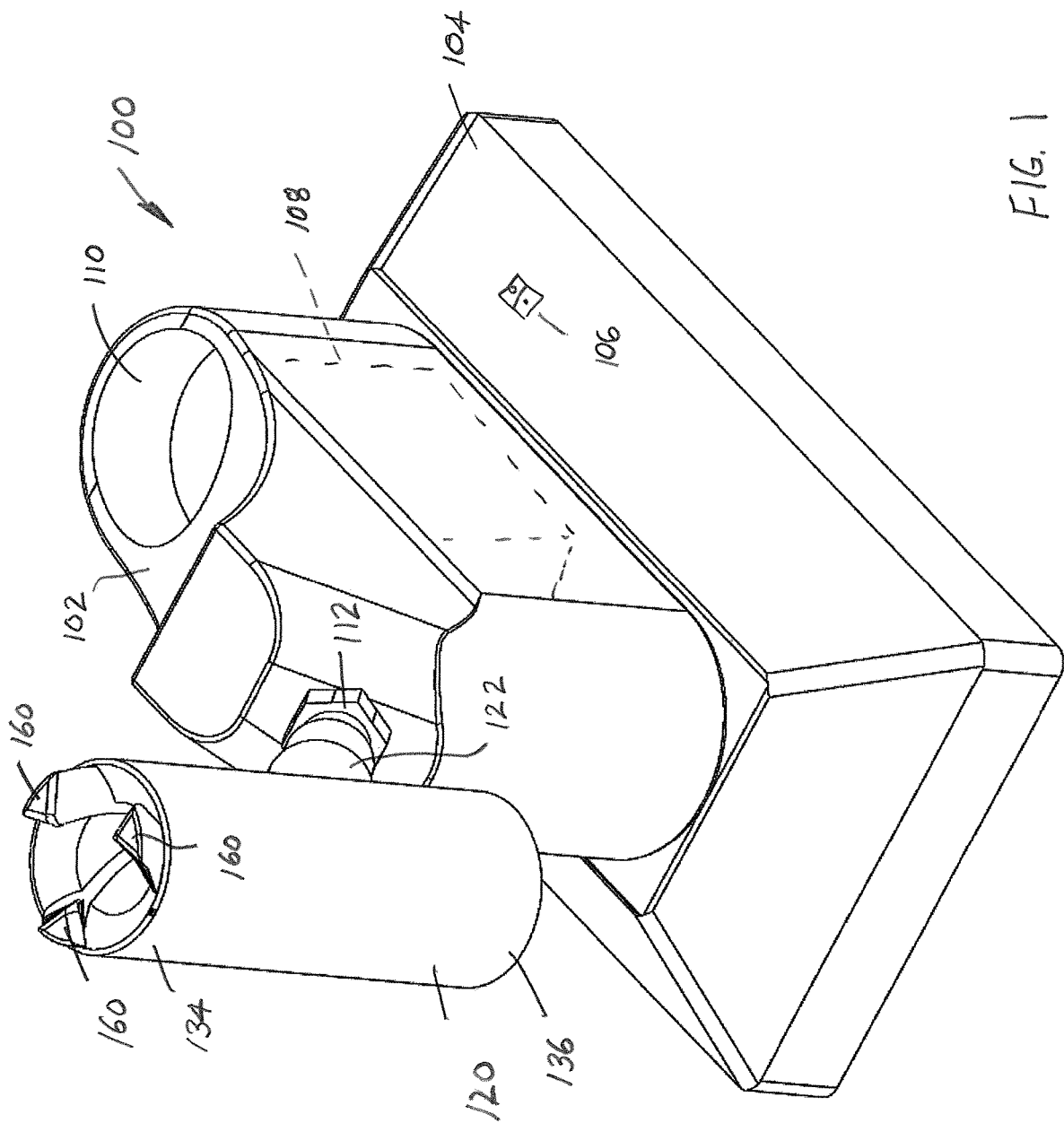
FIG. 1 is a perspective view from the top and one side of an apparatus for shrink wrapping a sleeve on a container assembly.

The following description with reference to the accompanying drawings is provided to assist in a comprehensive understanding of one or more embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. Various exemplary embodiments of the present disclosure are not limited to the specific details of different embodiments and should be construed as including all changes and/or equivalents or substitutes included in the ideas and technological scope of the appended claims. In describing the drawings, where possible similar reference numerals are used for similar elements, and it will be understood that the drawings are not to scale.

The terms "include" or "may include" used in the present disclosure indicate the presence of disclosed corresponding functions, operations, elements, and the like, and do not limit additional one or more functions, operations, elements, and the like. In addition, it should be understood that the terms "include", "including", "have" or "having" used in the present disclosure are to indicate the presence of components, features, numbers, steps, operations, elements, parts, or a combination thereof described in the specification, and do not preclude the presence or addition of one or more other features, numbers, steps, operations, elements, parts, or a combination thereof.

The terms "or" or "at least one of A and/or B" used in the present disclosure include any and all combinations of words enumerated with them. For example, "A or B" or "at least one of A and/or B" mean including A, including B, or including both A and B.

Although the terms such as "first" and "second" used in the present disclosure may modify various components or elements of the different exemplary embodiments, these terms do not limit the corresponding components or elements. For example, these terms do not limit an order and/or importance of the corresponding elements, nor do these terms preclude additional elements (e.g., second, third, etc.). The terms may be used to distinguish one element from another element. For example, a first mechanical device and a second mechanical device all indicate mechanical devices and may indicate different types of mechanical devices or the same type of mechanical device. For example, a first element may be named a second element without departing from the scope of the various exemplary embodiments of the present disclosure, and similarly, a second element may be named a first element.

It will be understood that, when an element is mentioned as being "connected" or "coupled" to another element, the element may be directly connected or coupled to another element, and there may be an intervening element between the element and another element. To the contrary, it will be understood that, when an element is mentioned as being "directly connected" or "directly coupled" to another element, there is no intervening element between the element and another element.

The terms "generally" or "substantially" are intended to describe a range, such as "generally perpendicular", "substantially perpendicular", or "perpendicular" are intended to be interchangeably used as synonymous terminology (e.g., may represent an angular range between two components for example from 85 to 95 degrees; or may represent an angular range relationship for example from 87 to 93 degrees, or may represent an angular relationship of 90 degrees) unless the description otherwise describes and limits the term to a specific angular range for a specific reason or purpose, or is specifically described otherwise such as "exactly perpendicular".

The terms used in the various exemplary embodiments of the present disclosure are for the purpose of describing specific exemplary embodiments only and are not intended to limit various exemplary embodiments of the present disclosure. As used herein, the singular forms are intended to include the plural forms as well, unless the context clearly indicates otherwise.

All of the terms used herein including technical or scientific terms have the same meanings as those generally understood by an ordinary skilled person in the related art unless they are defined otherwise. The terms defined in a generally used dictionary should be interpreted as having the same meanings as the contextual meanings of the relevant technology and should not be interpreted as having inconsistent or exaggerated meanings unless they are clearly defined in the various exemplary embodiments.

Figure 2:
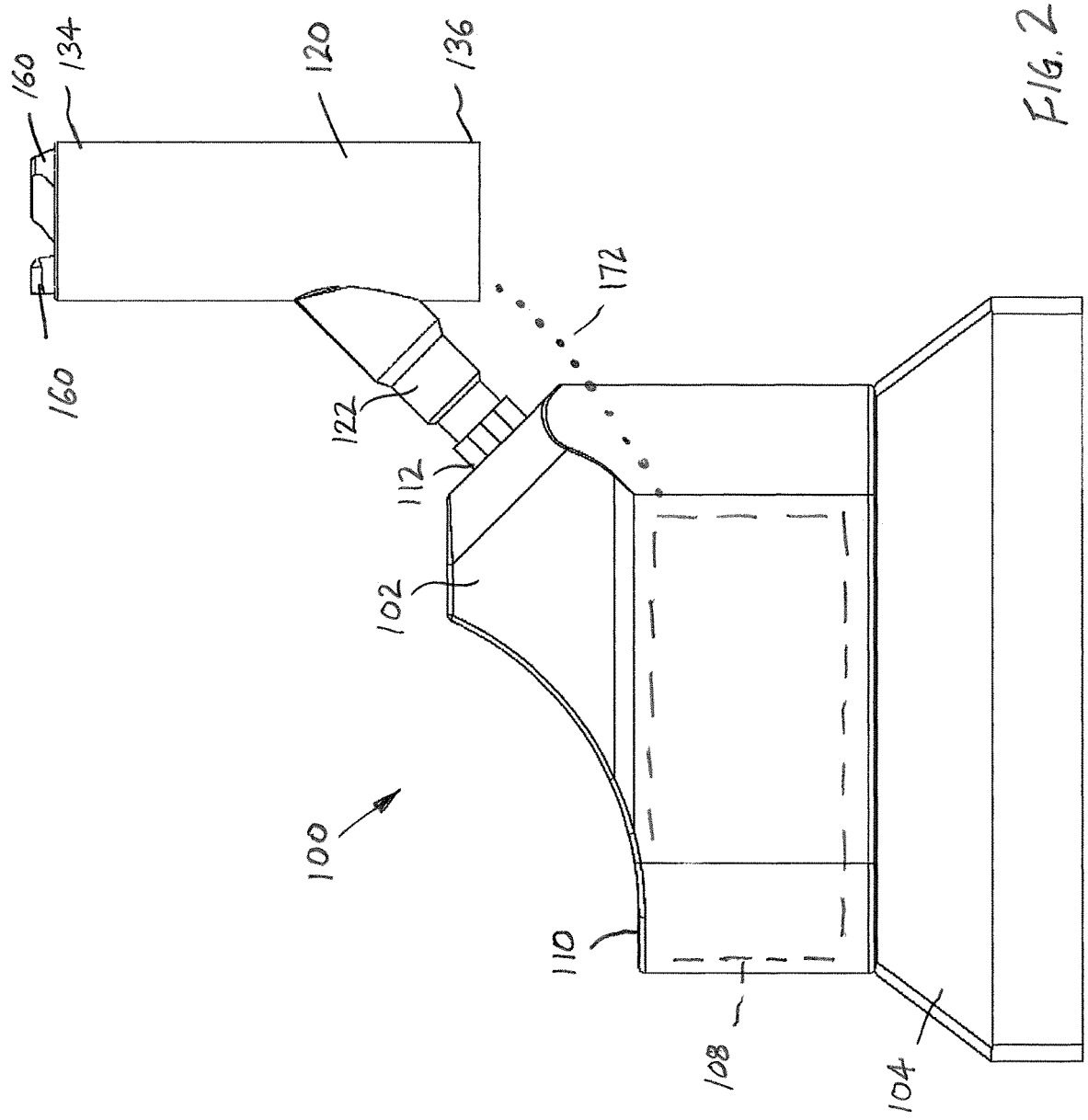
FIG. 2 is a side elevational view of the apparatus of FIG. 1.
Figure 3:
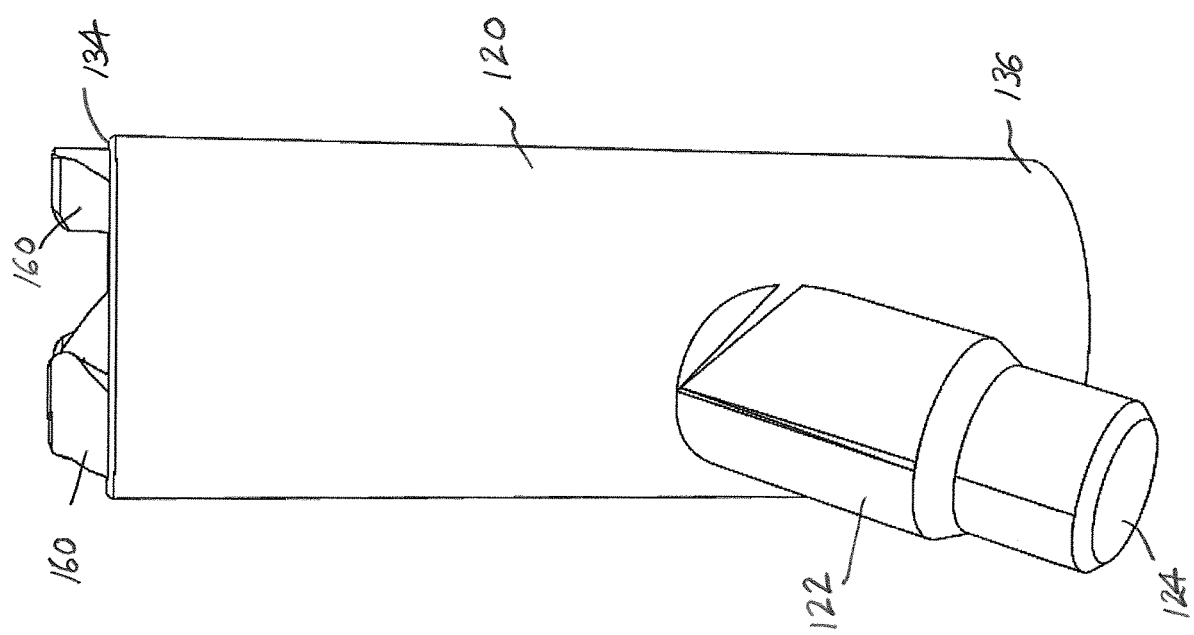
FIG. 3 is a view of the housing/turbine used in the shrink wrapping apparatus of FIG. 1.
Figure 4:
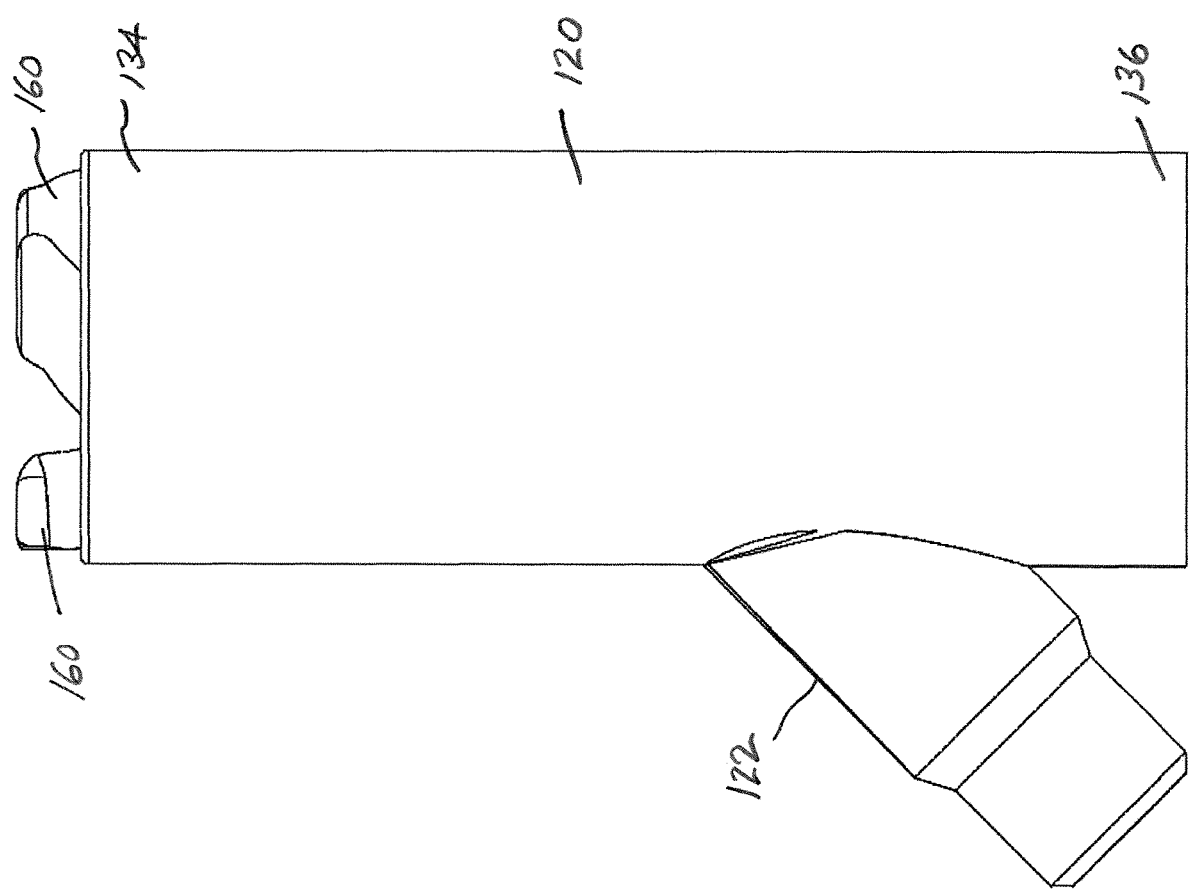
FIG. 4 is a side elevational view of the turbine of FIG. 3.
Figure 5:
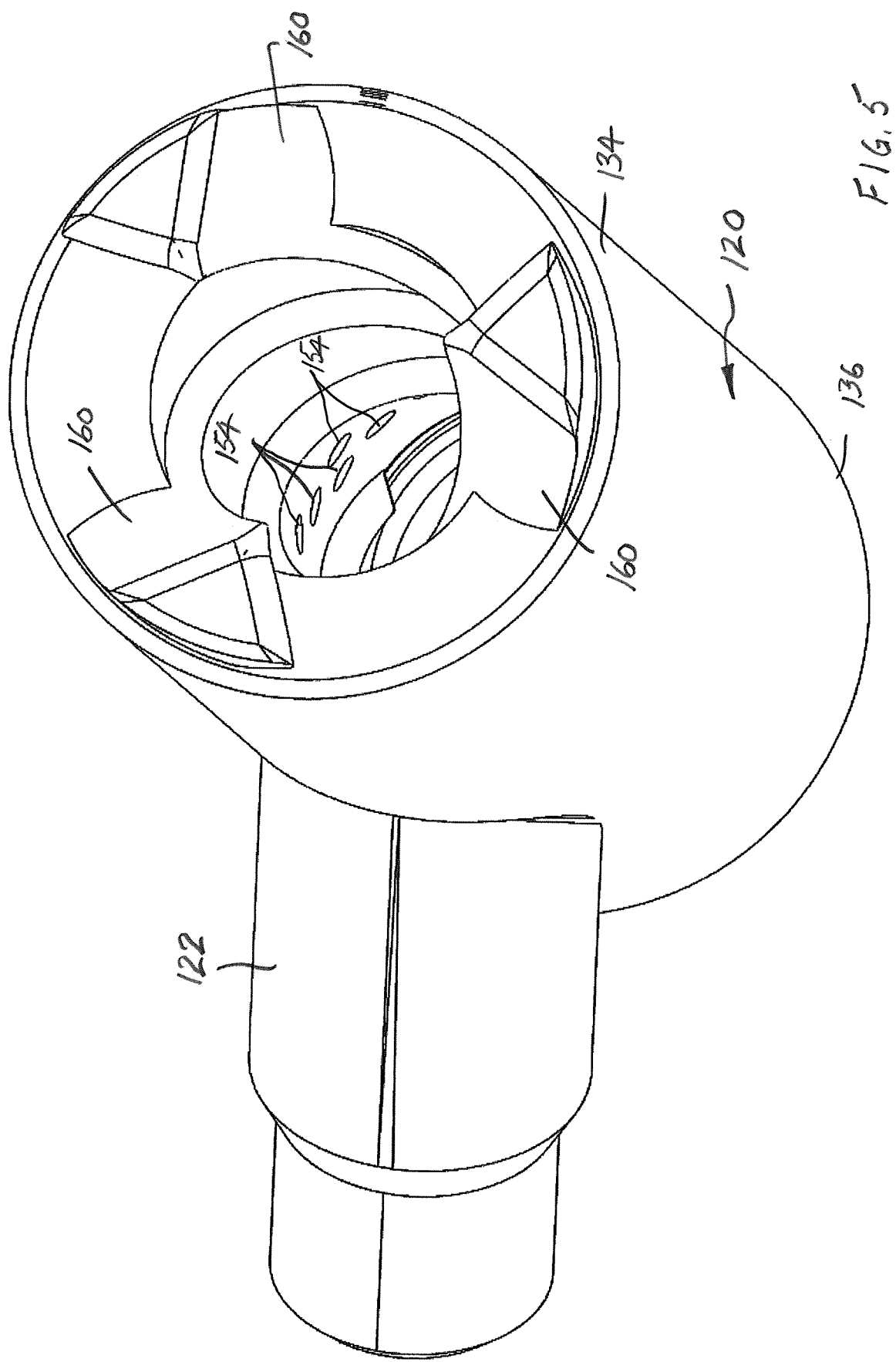
FIG. 5 is a perspective view taken generally from the top of the turbine of FIG. 3.
Figure 6:
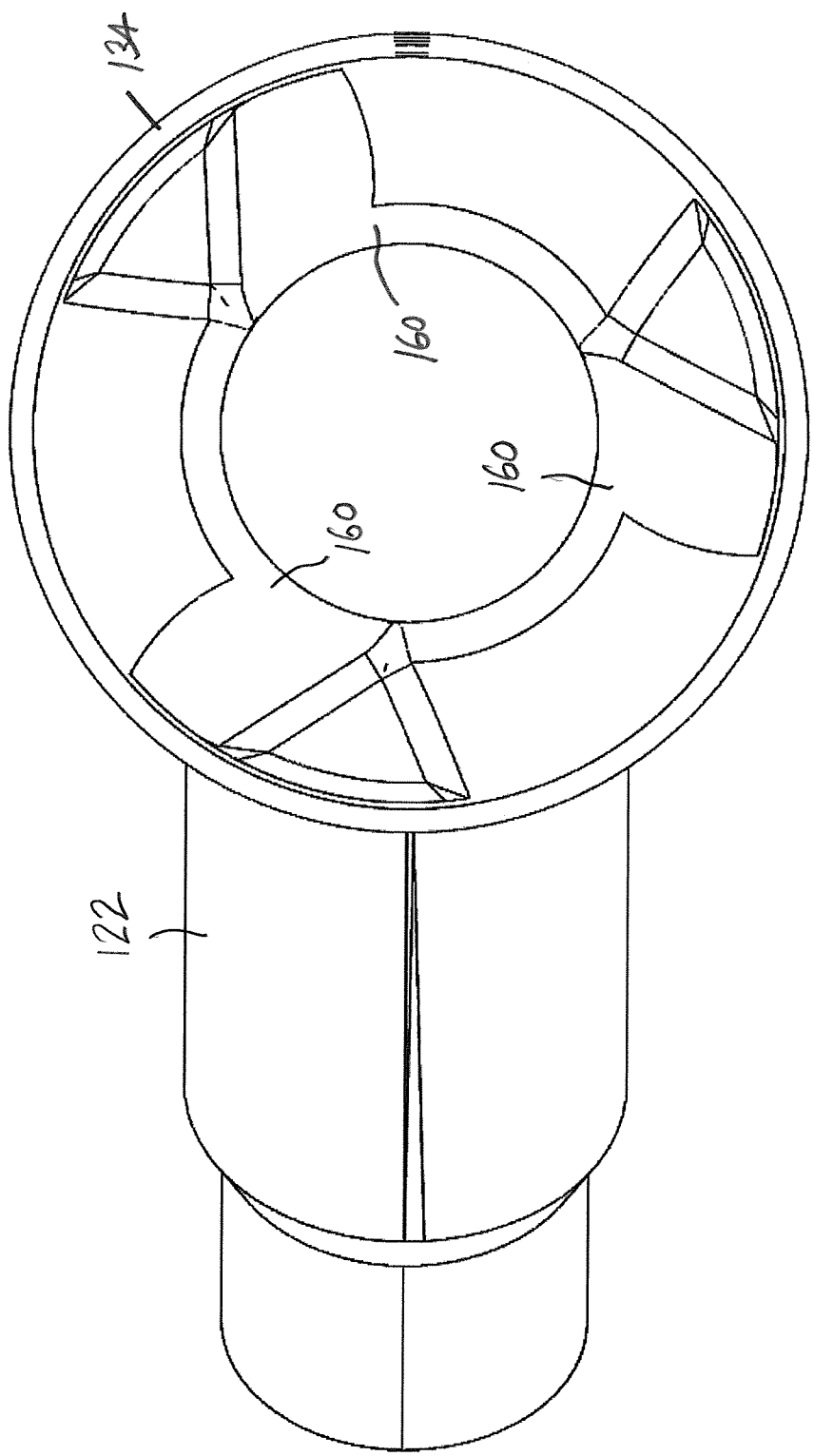
FIG. 6 is a top plan view of the turbine of FIG. 3.
Figure 7:
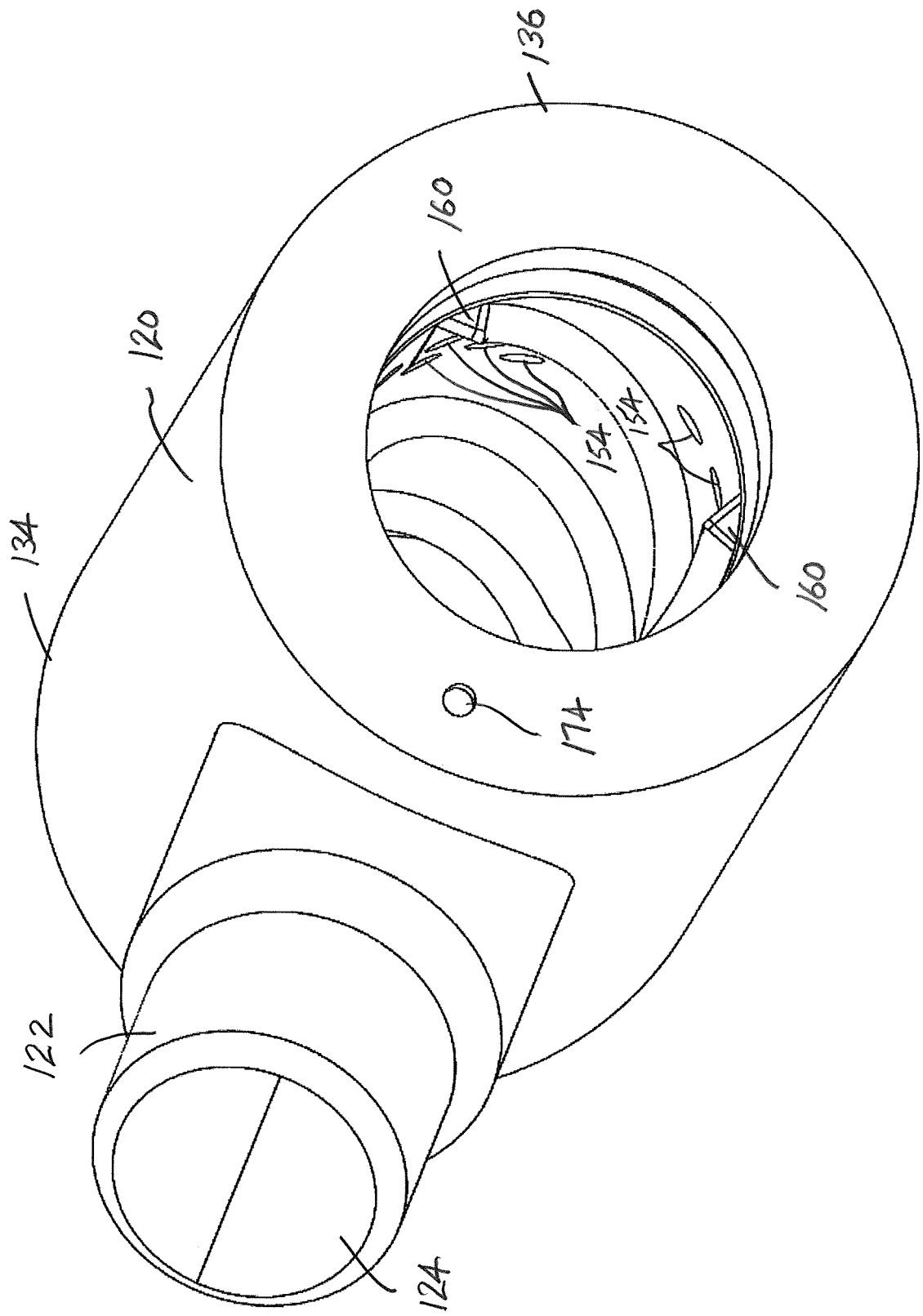
FIG. 7 is a perspective view taken generally from the bottom of the turbine of FIG. 3.
Figure 8:
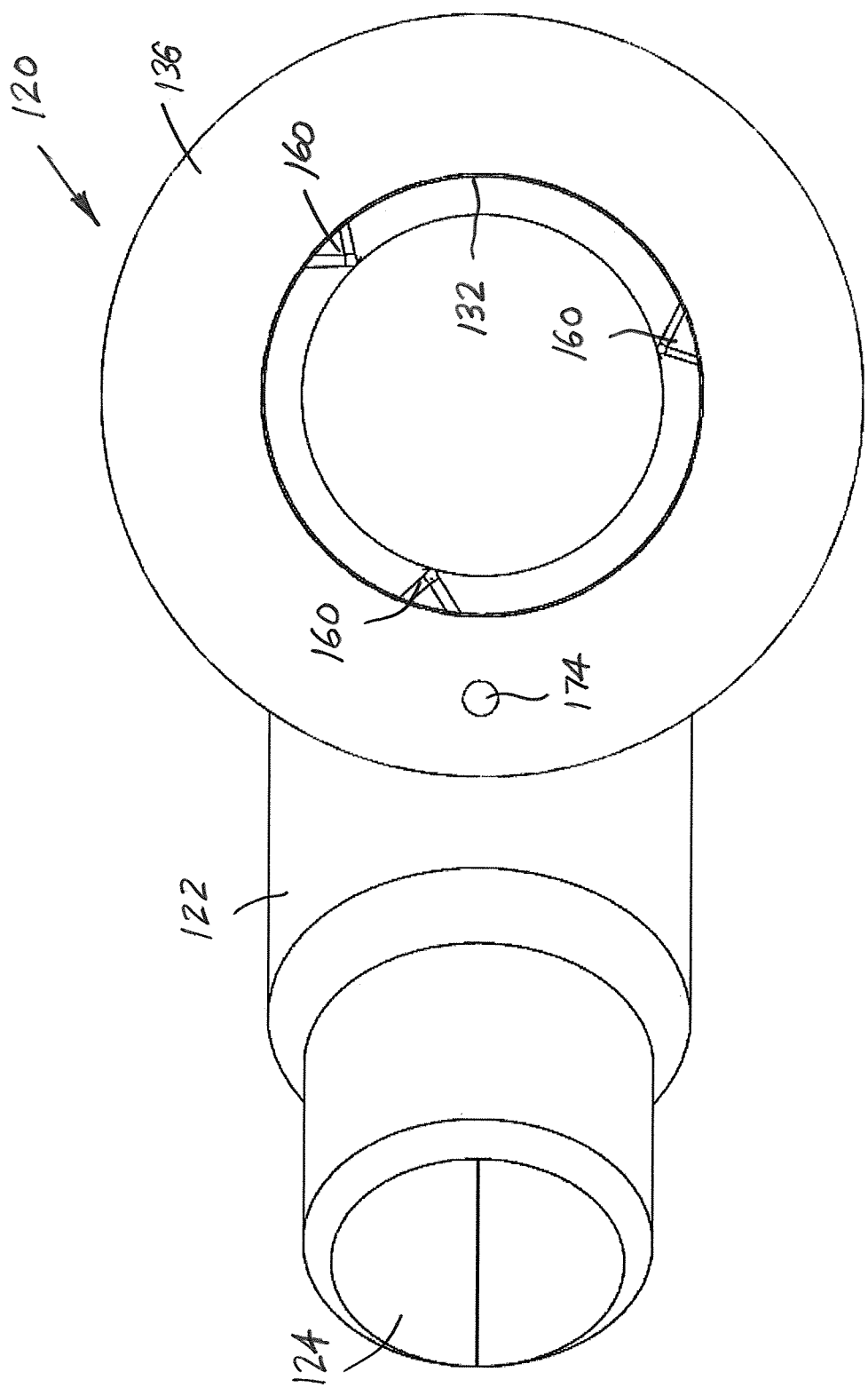
FIG. 8 is a bottom plan view of the turbine of FIG. 3.
Figure 16:
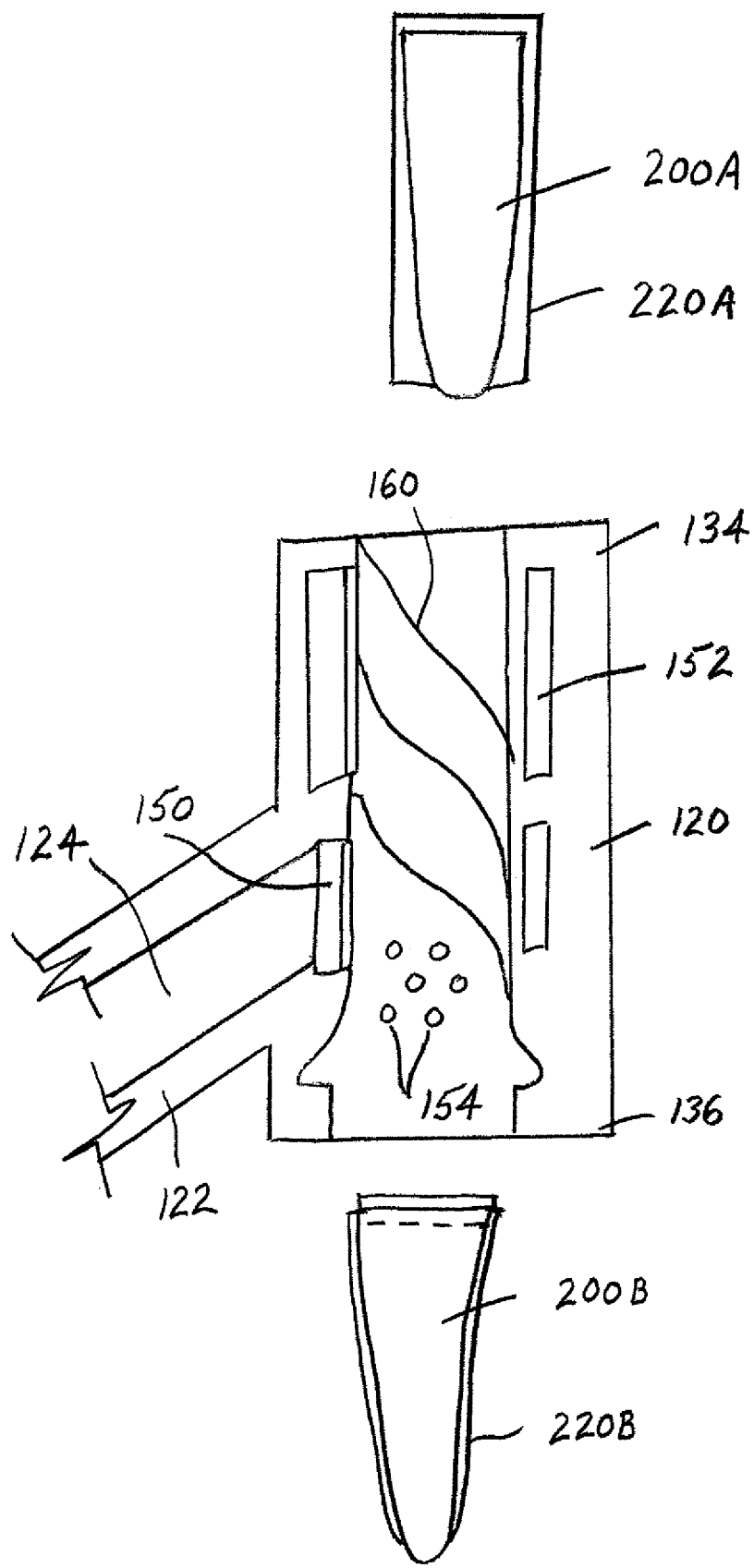
FIG. 16 is a schematic representation of a container assembly and sleeve being inserted into an inlet end of the housing/turbine and a container assembly with the sleeve shrink-wrapped thereon exiting the outlet end of the turbine.
Figure 17:
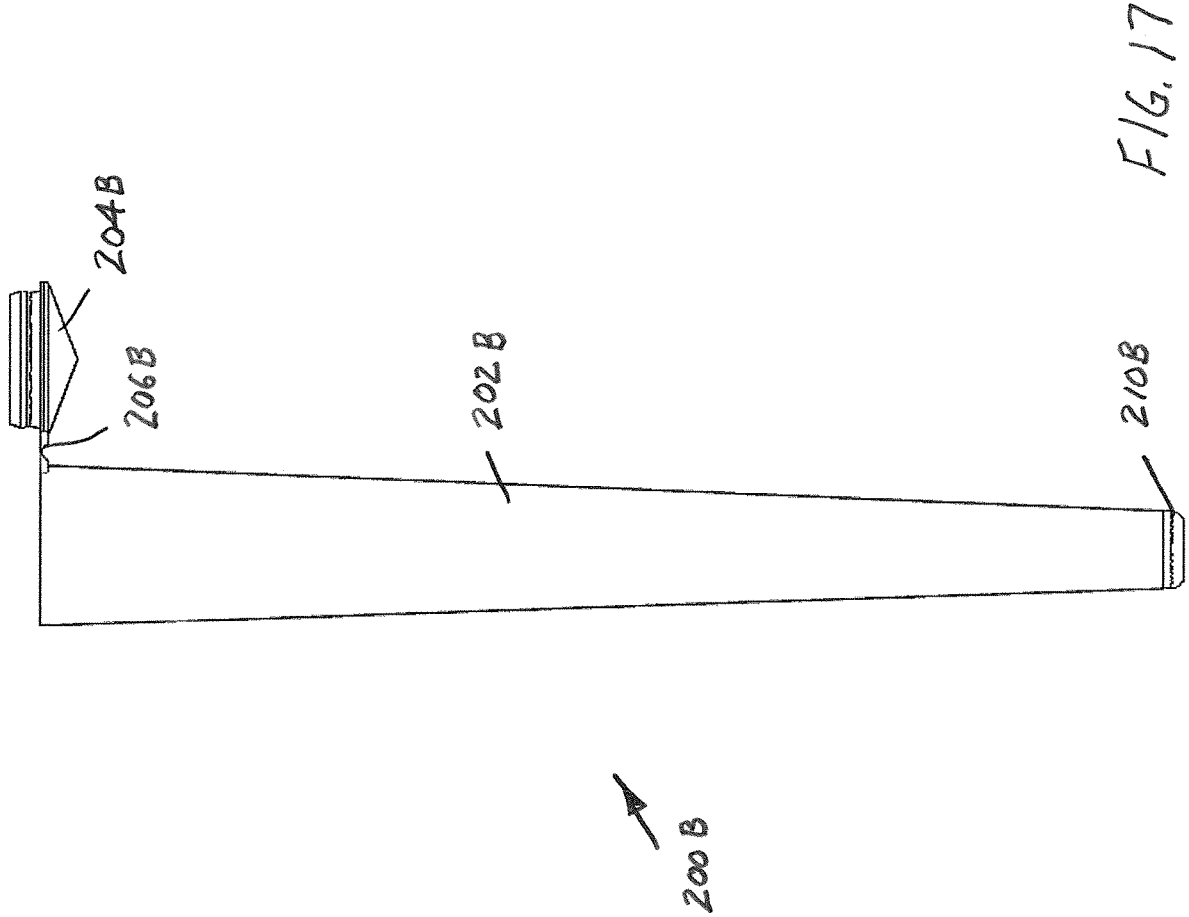
FIGS. 17 and 18 are elevational views of open and closed positions of an alternative container assembly.
Figure 18:
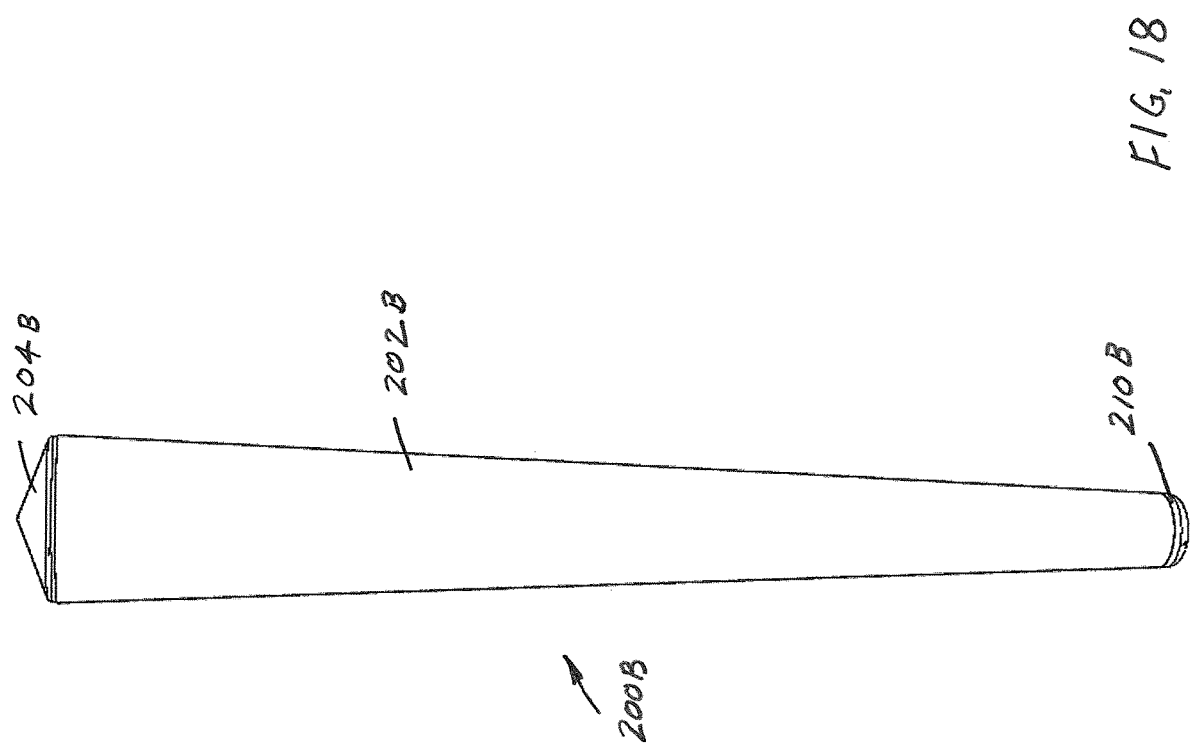
Figure 19:
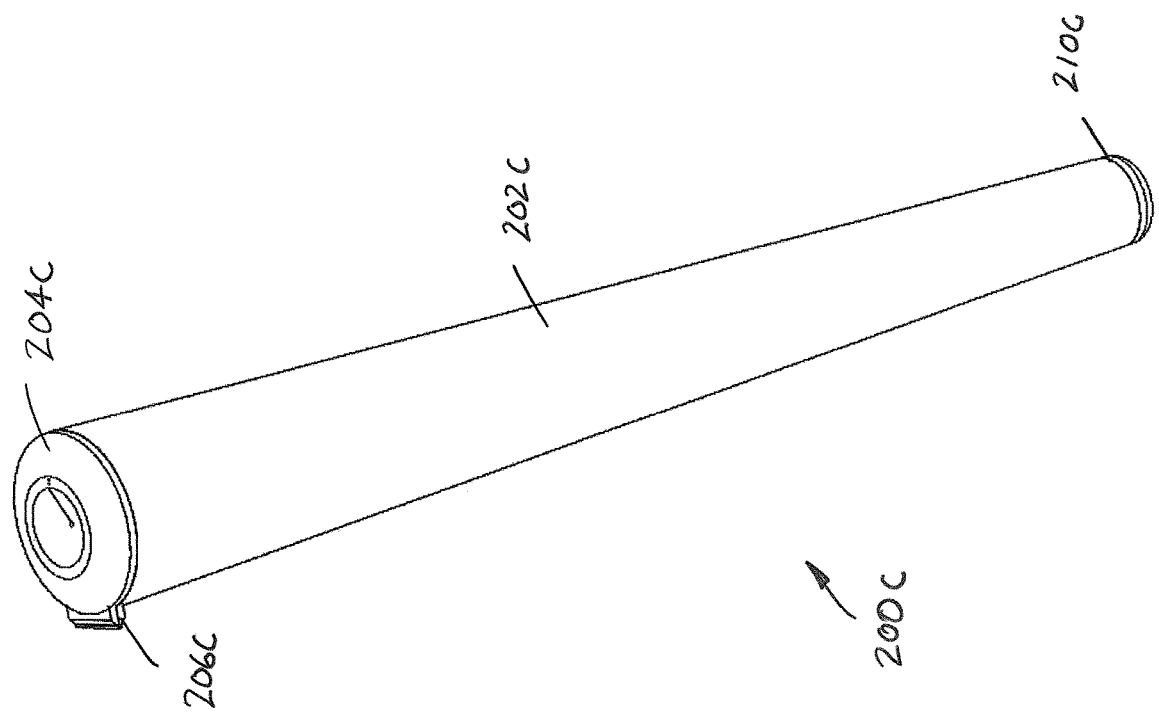
FIGS. 19 and 20 are elevational views of closed and open positions of an alternative container assembly.
Figure 20:
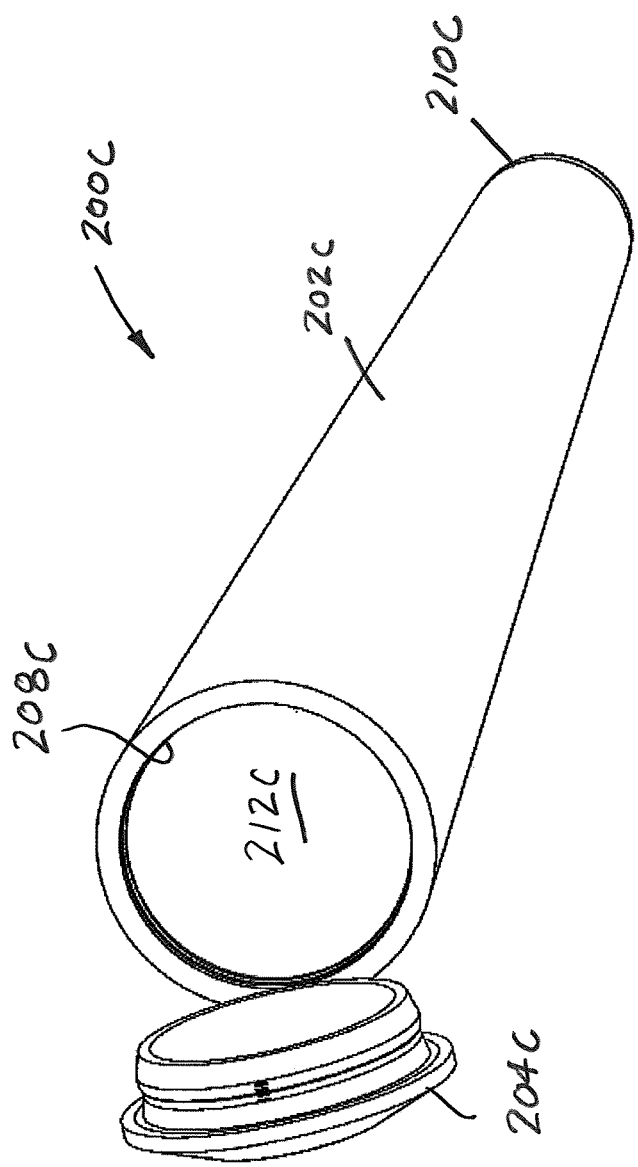
Figure 21:
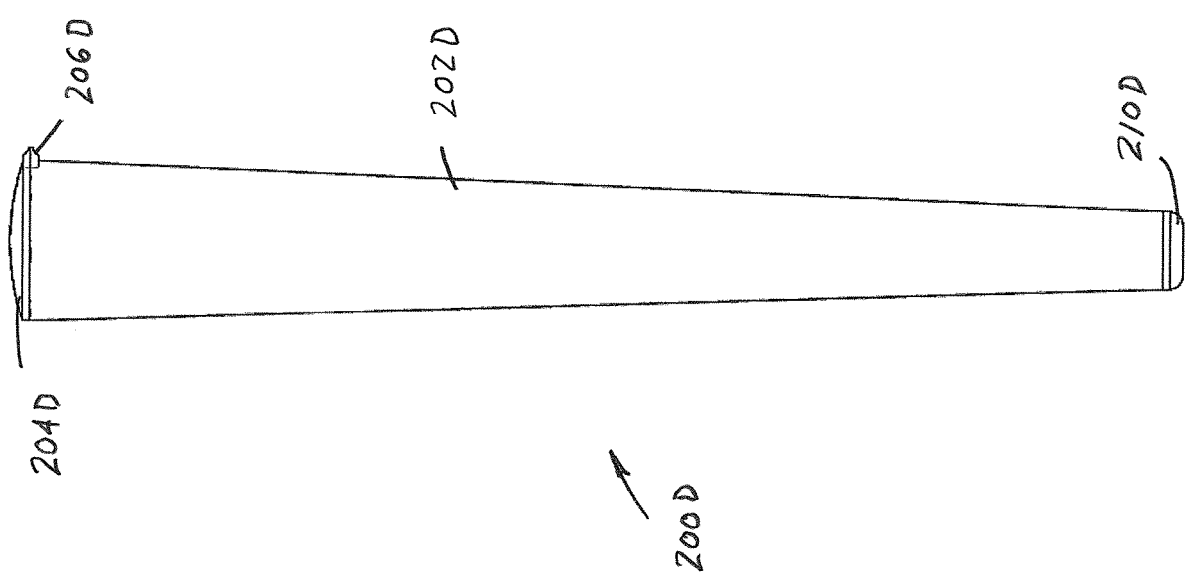
FIGS. 21 and 22 are elevational views of closed and open positions of an alternative container assembly.
Figure 22:
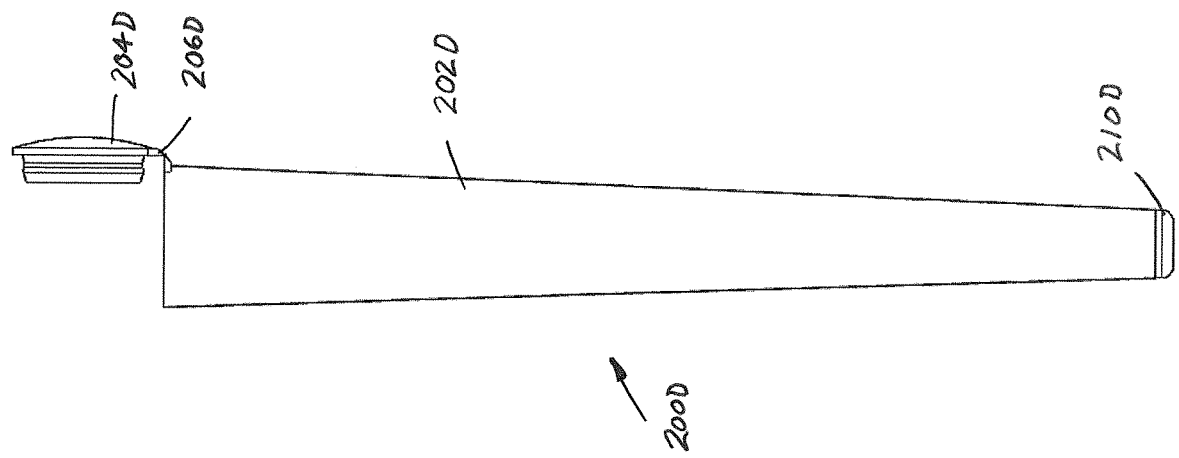
Figure 23:
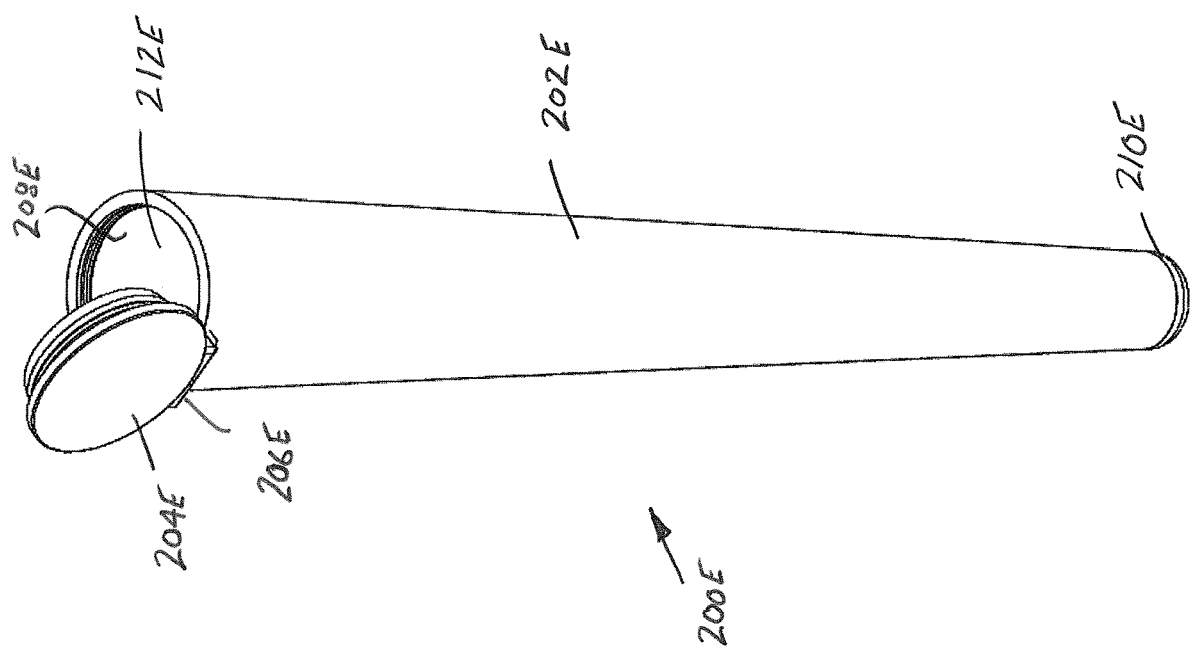
FIGS. 23 and 24 are elevational views of open and closed positions of an alternative container assembly.
Figure 24:
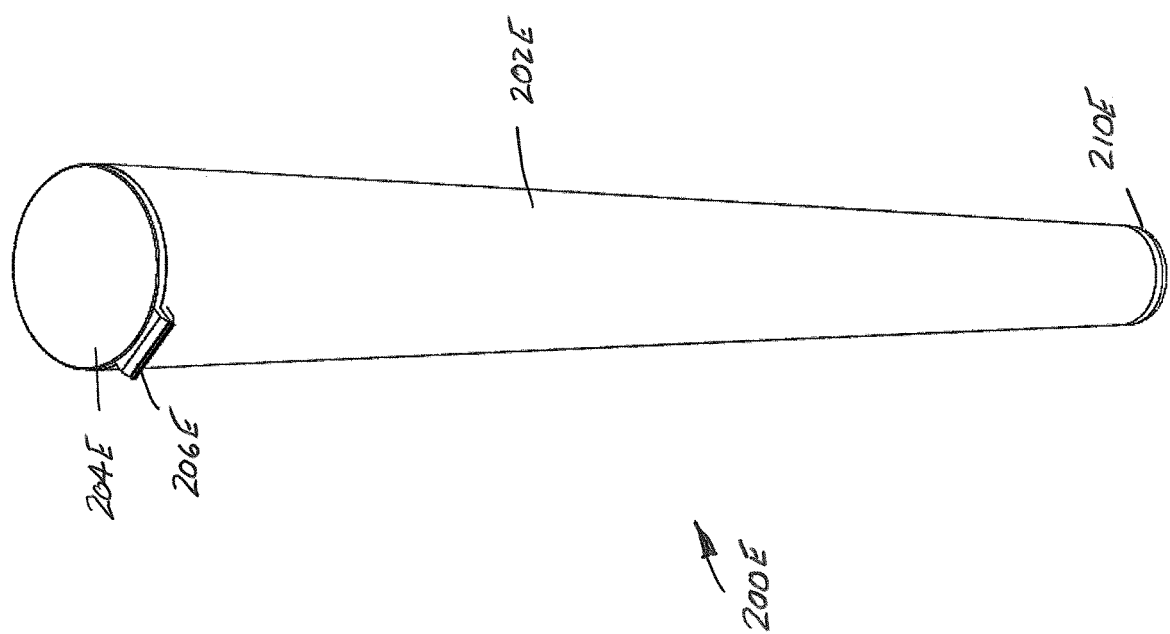
Figure 25:
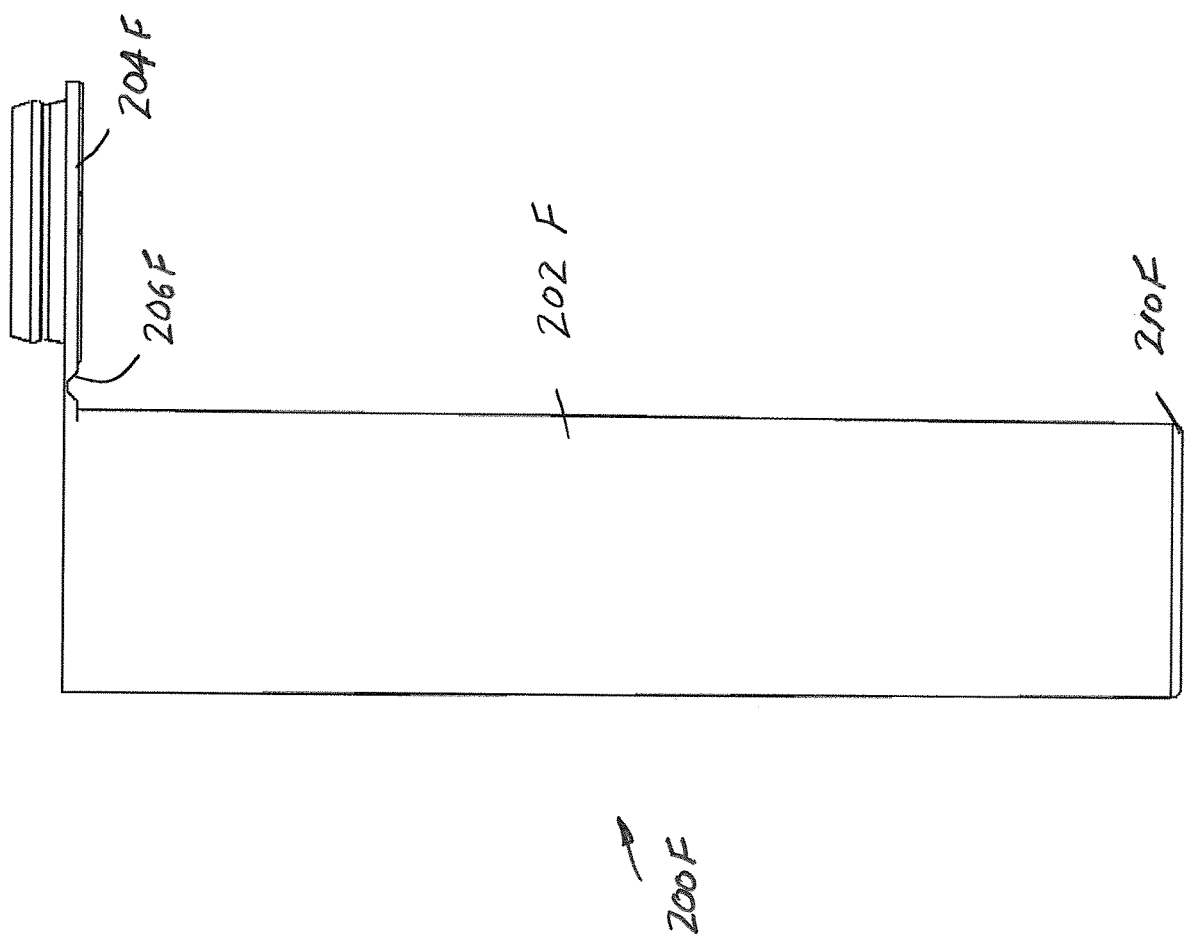
FIGS. 25 and 26 are elevational views of open and closed positions of an alternative container assembly.
Figure 26:
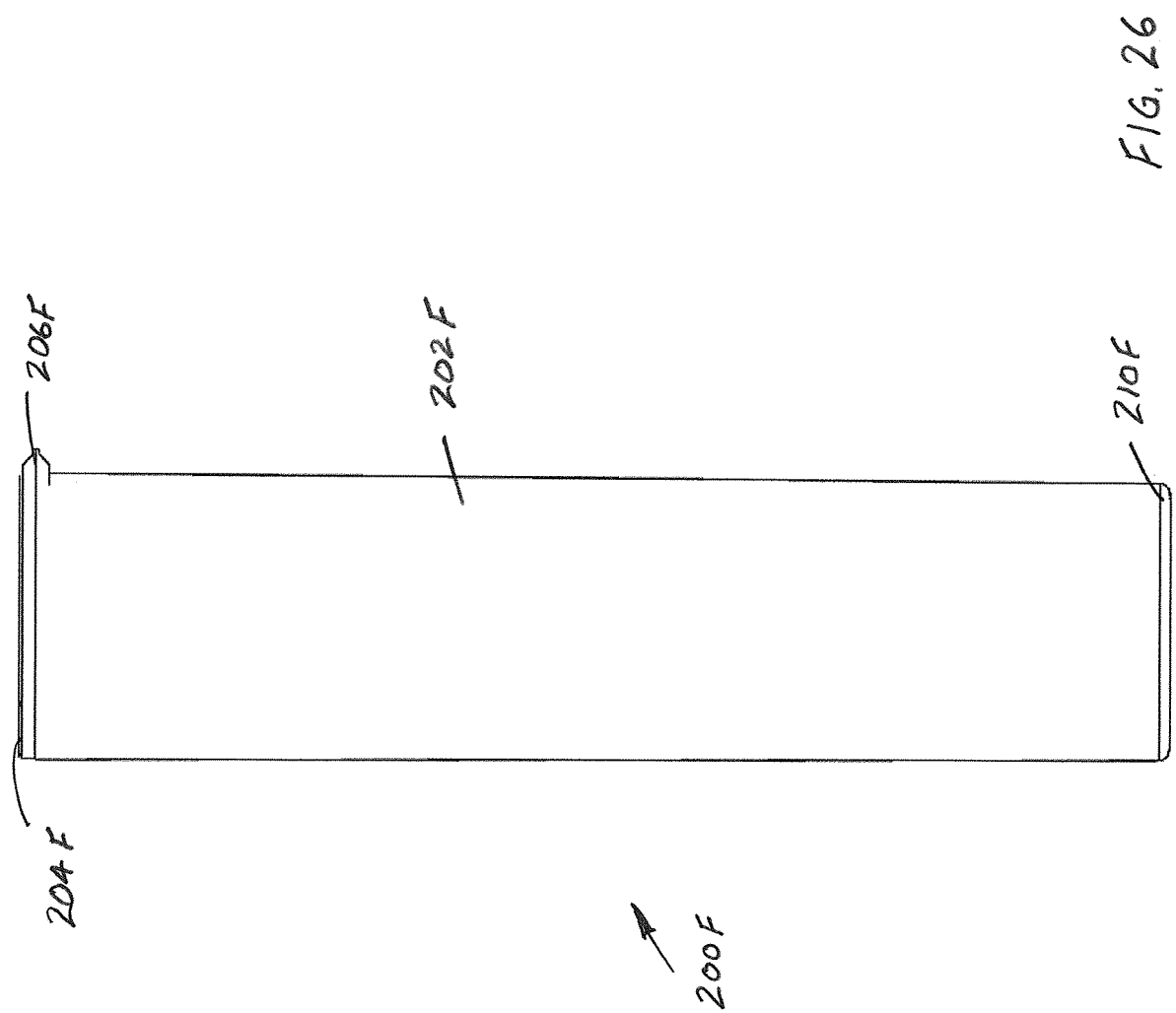
Figure 27:
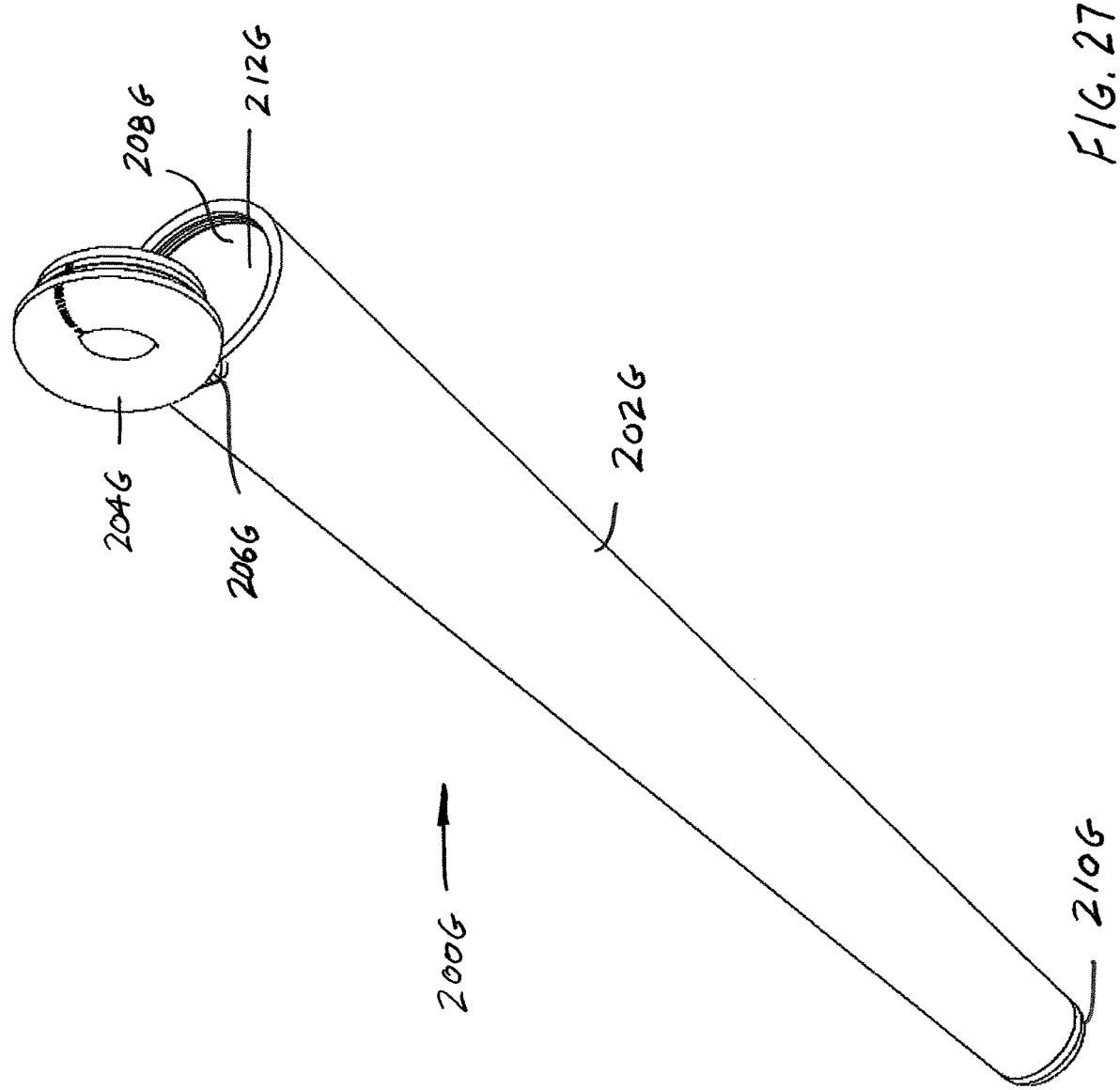
FIGS. 27 and 28 are perspective views of open and closed positions of an alternative container assembly.
Figure 28:
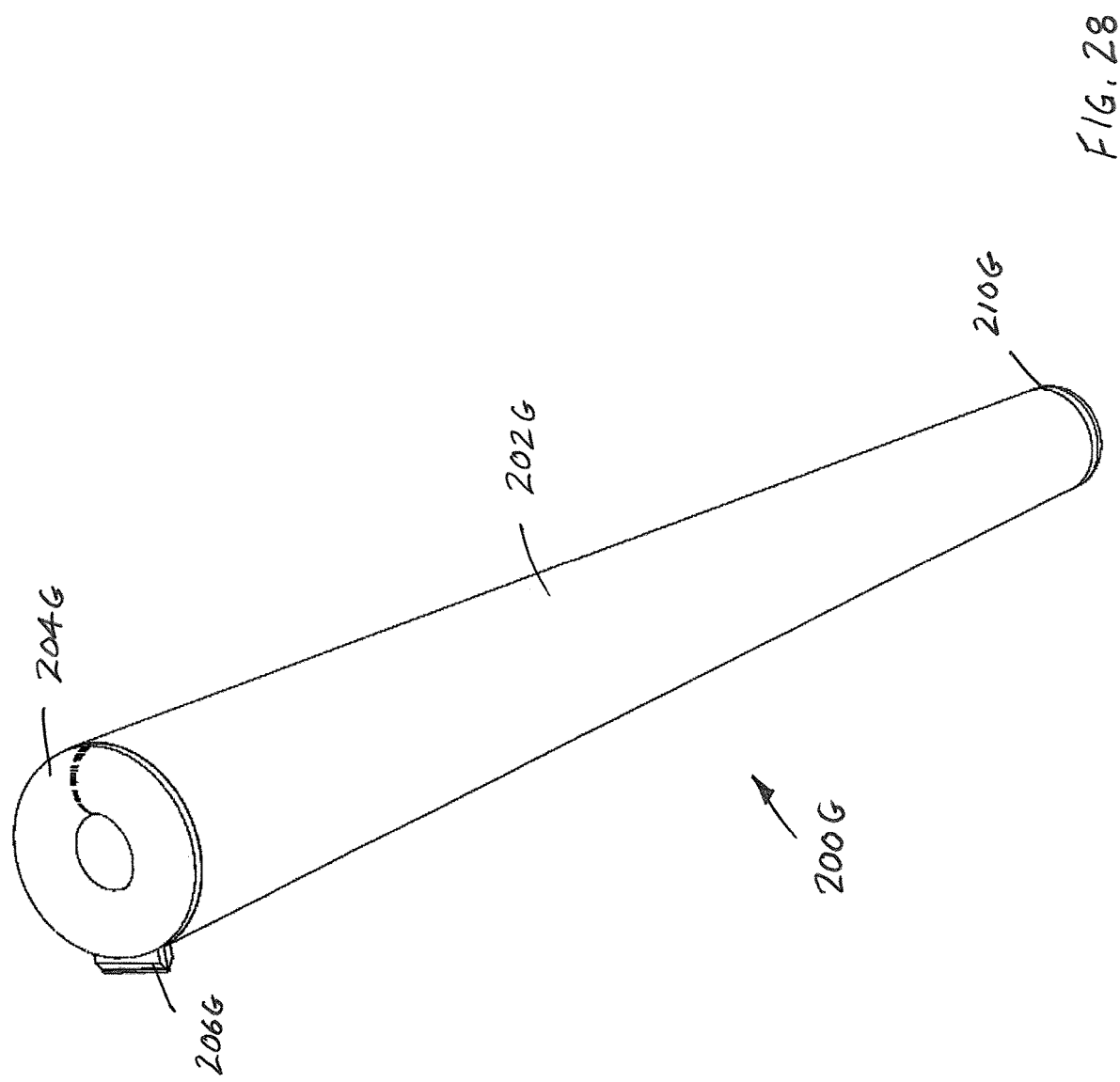
Figure 29:
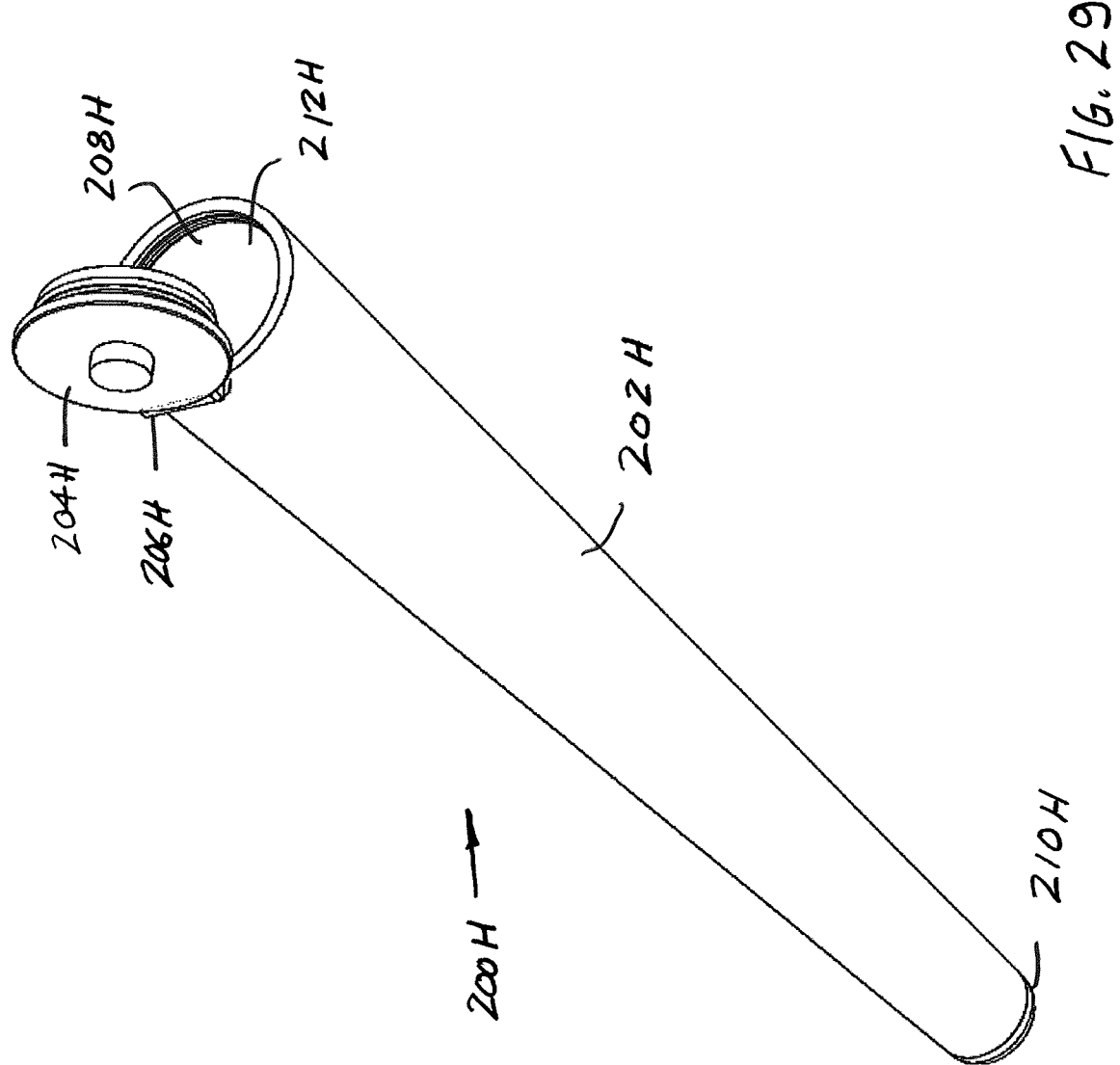
FIGS. 29 and 30 are perspective views of open and closed positions of an alternative container assembly.
Figure 30:
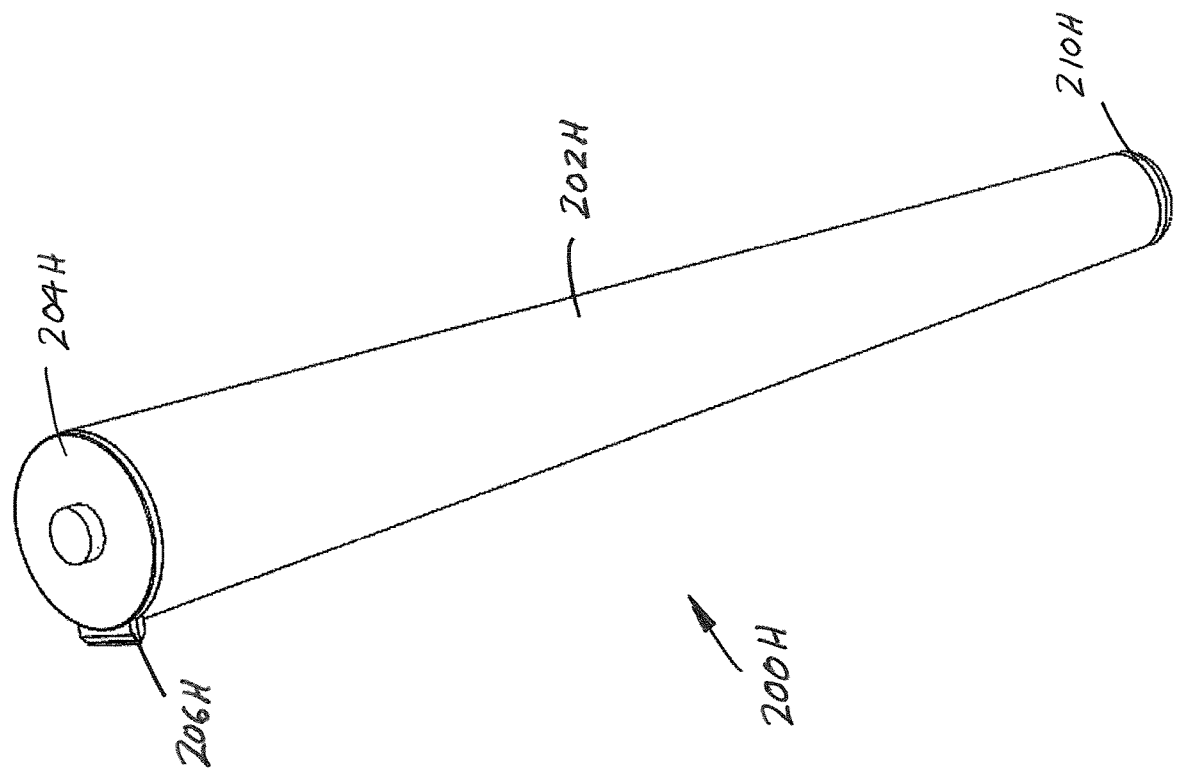
Figure 31:
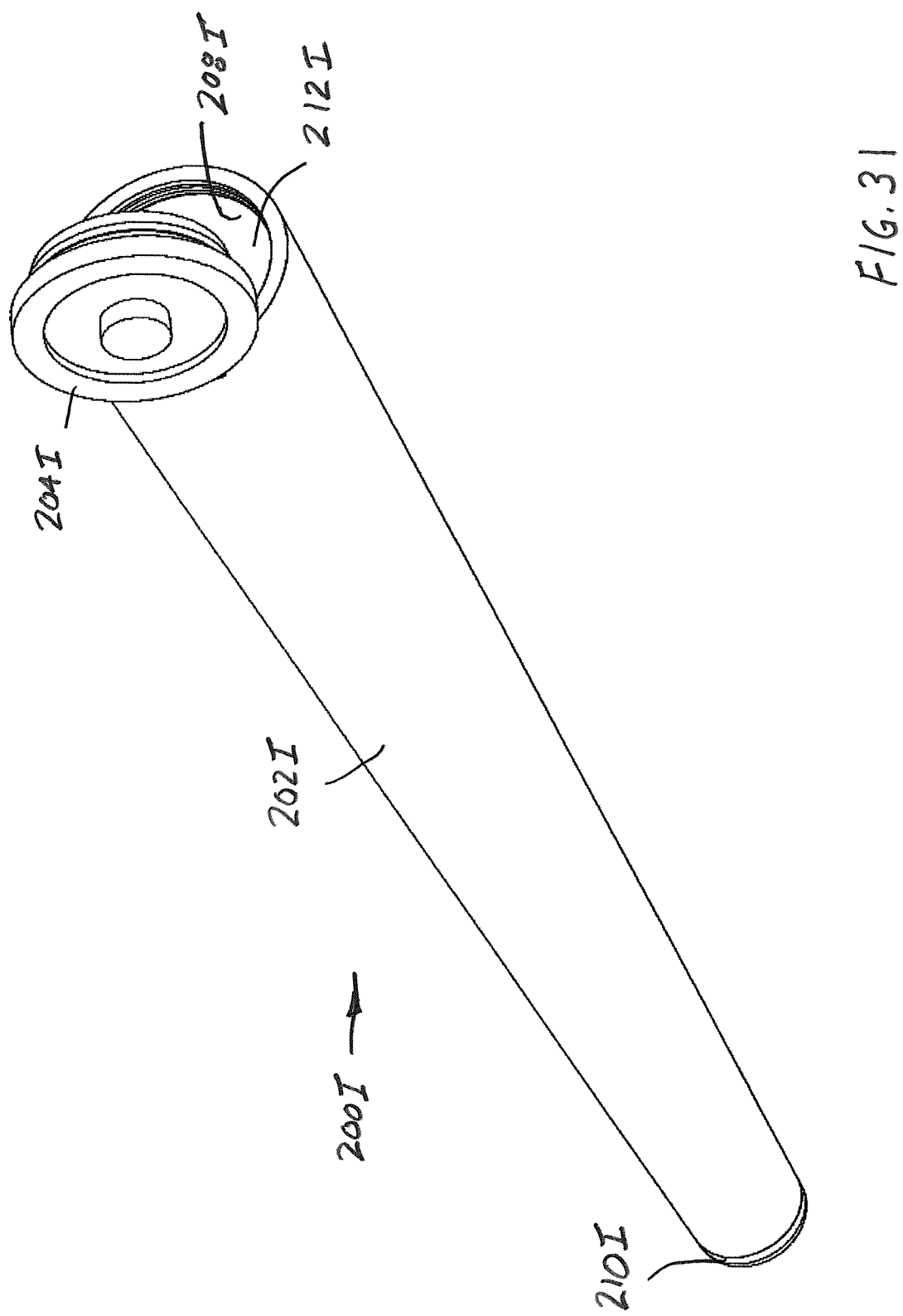
FIGS. 31 and 32 are perspective views of open and closed positions of an alternative container assembly.
Figure 32:
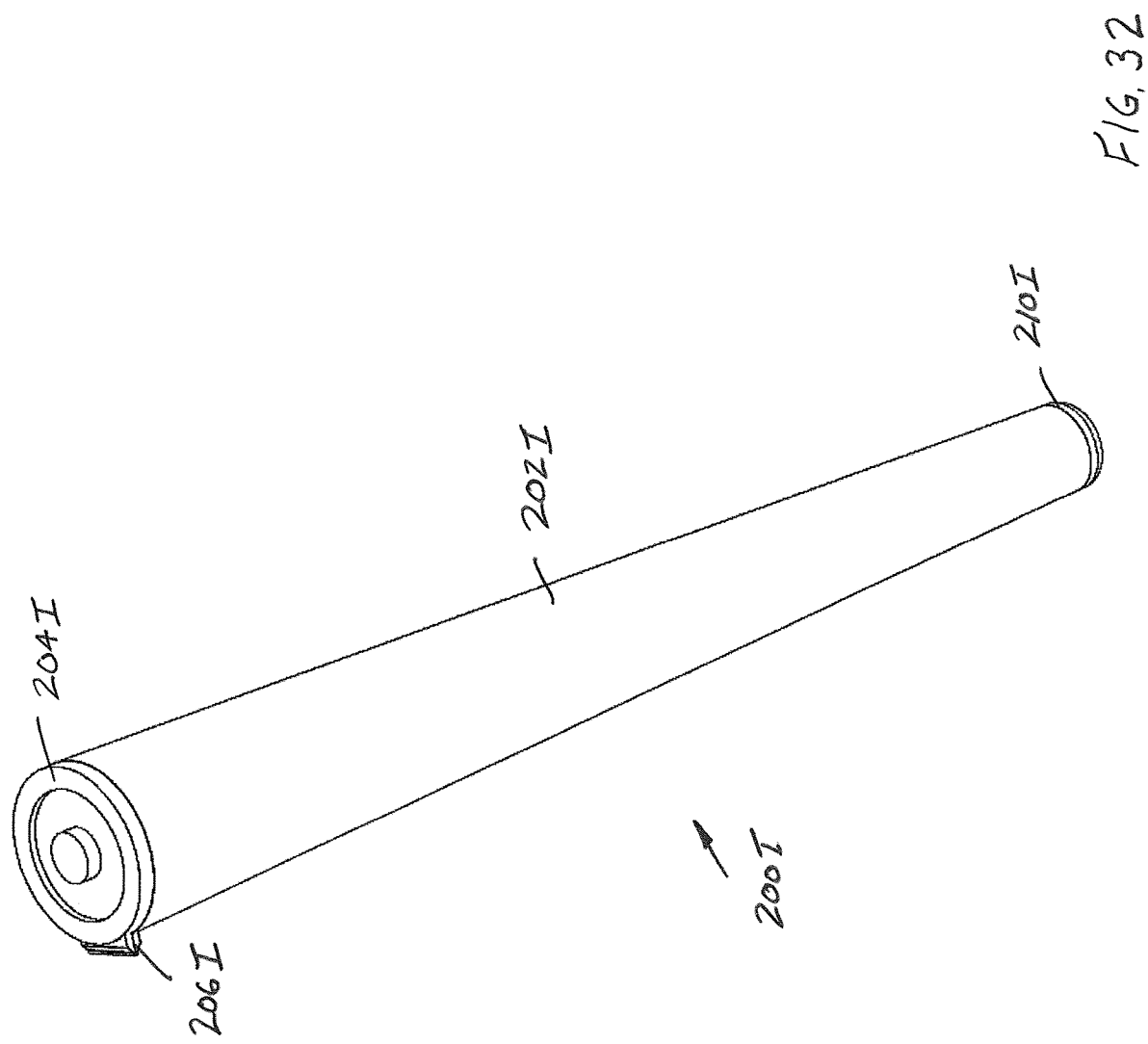
Figure 33:
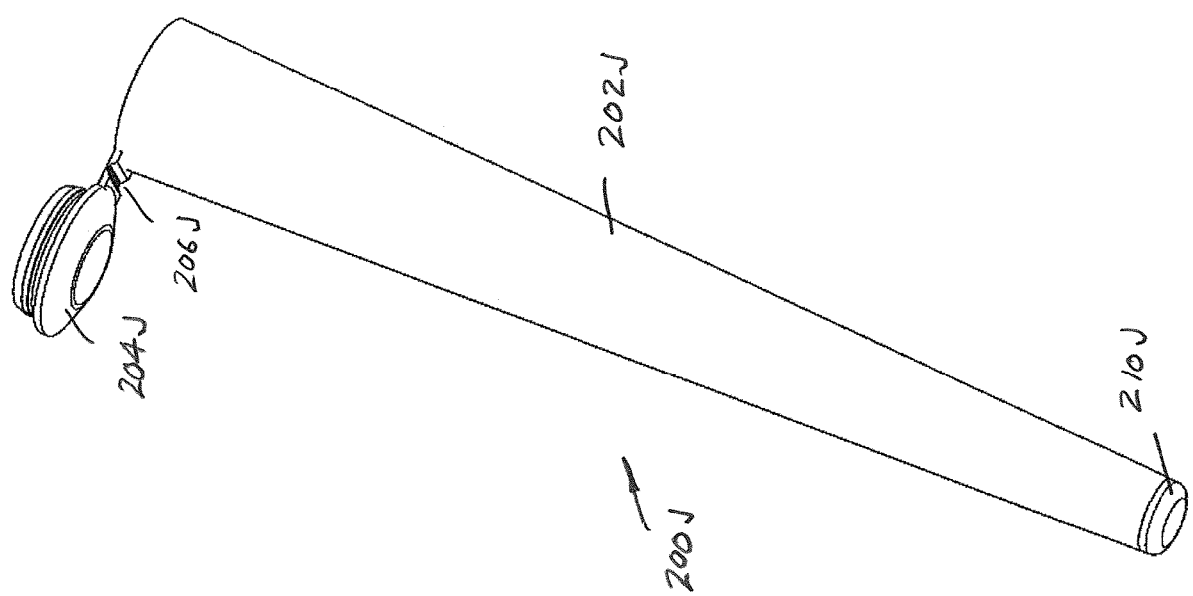
FIGS. 33 and 34 are perspective views of open and closed positions of an alternative container assembly.
Figure 34:
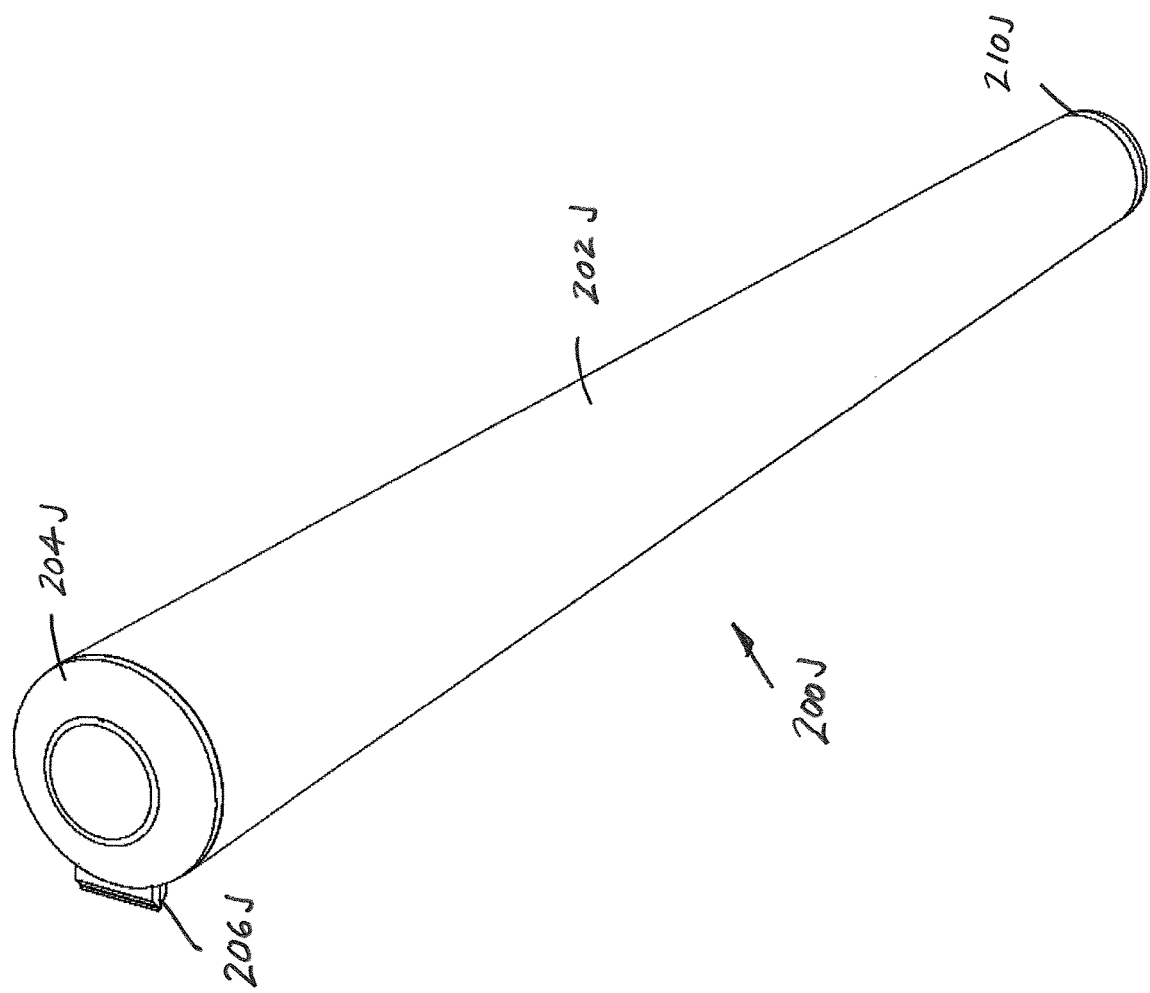
Figure 35:
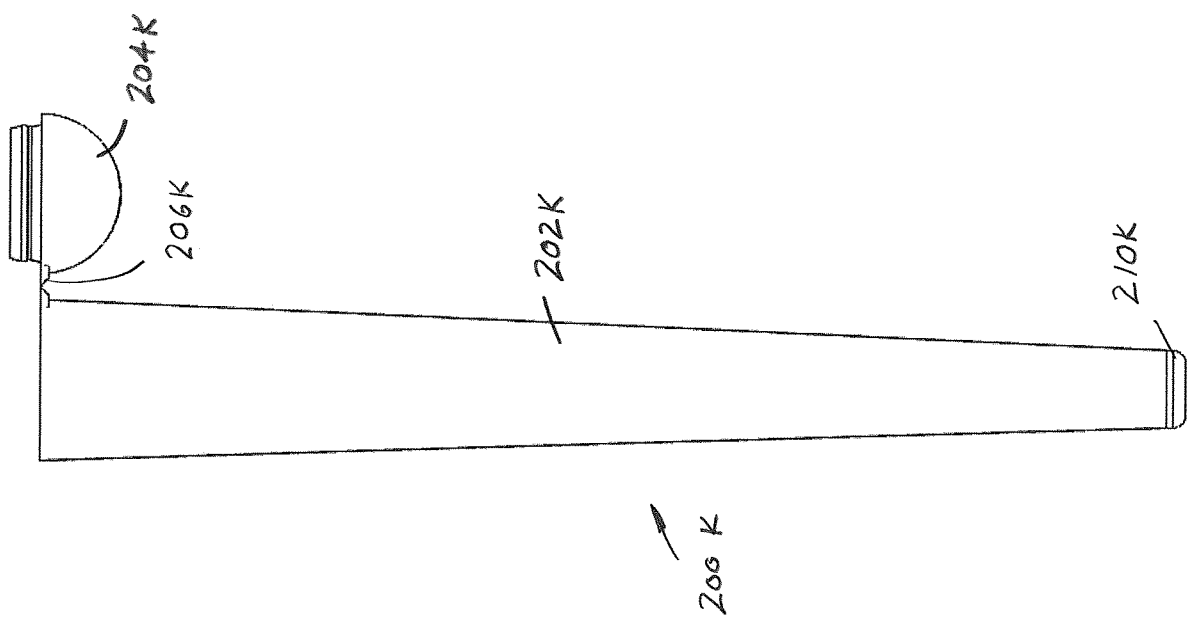
FIGS. 35 and 36 are elevational views of open and closed positions of an alternative container assembly.
Figure 36:
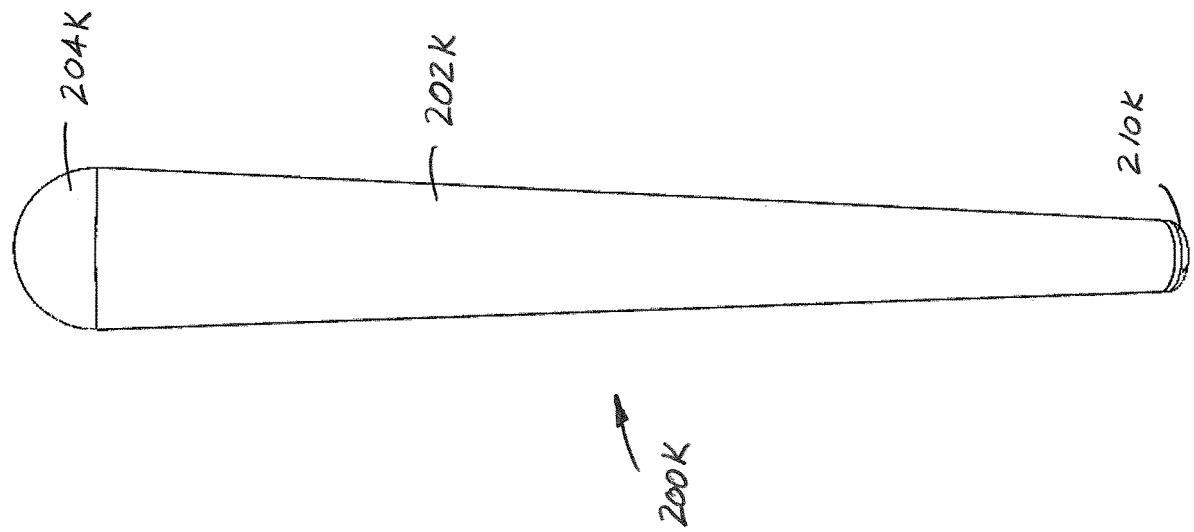

FIGS. 1 and 2 illustrate an apparatus or steamer apparatus 100 for a shrink wrap or shrink sleeve such as a thin, hollow plastic sleeve or cylinder received over a container assembly (where the container assembly includes a container or container body and a cap) such as illustrated in FIG. 16. As will become more apparent below, the container and the cap may be separate components or integrally formed and joined together in both the open and closed positions, for example, via a hinge. More particularly, apparatus 100 heats and shrinks the plastic sleeve over portions of both the container body and the cap, particularly along the interface of the cap closed on the container body as will be described in greater detail below.

The steamer apparatus 100 includes a housing 102 having a base 104 that has a wide footprint allowing the apparatus to be stably positioned on a work surface. A power switch 106 when switched to the "on" position provides power to the steamer apparatus 100 (e.g., AC or DC power). A reservoir 108 is provided in the housing 102 and well or recess 110 provides selective access to refill the reservoir with a fluid, such as water. Internal to the housing is a heater (not shown) that is controlled by the power switch 106. With water in the reservoir 108, and the power switch 106 turned "on", the water is quickly heated to a boiling point to produce steam. The steam exits the housing 102 through outlet 112 which is in fluid communication with the steam produced in the housing. Thus, the description to this point can generally be referred to as a steam source, and does not preclude another conventional steam source that may be used with the shrink sleeve apparatus 100 to be described further below (and which in this instance, the shrink sleeve apparatus is a part of a steamer apparatus).

Outlet 112 receives a shrink sleeve apparatus having a housing or turbine 120 shown in FIGS. 1-2, and more particular details of which are illustrated in FIGS. 3-9. The turbine 120 is mechanically and sealingly secured to the steamer housing 102 particularly via an attachment portion 122, and thus can be considered a part of the steamer housing, or may be made as a separate assembly that is provided steam from the steamer apparatus 100 or another steam source. The turbine attachment portion 122 includes an internal channel 124 that communicates the steam from the steam source, e.g., steam generated in the steamer housing, to the turbine 120. As particularly shown in FIGS. 3-9, the turbine 120 includes a passage 130 defined by a wall 132 where the passage has a first end or inlet 134 and a second end or outlet 136 where the outlet is spaced from the inlet. More particularly, the inlet 134 is located vertically above the outlet 136 so that the hot steam from the steam source provided to channel 124 and passage 130 advantageously and naturally rises vertically upward in the general direction from adjacent the outlet toward the inlet, and the force of gravity acting downwardly from the inlet toward the outlet is also advantageously used in a manner to be described further below.

Figure 9:
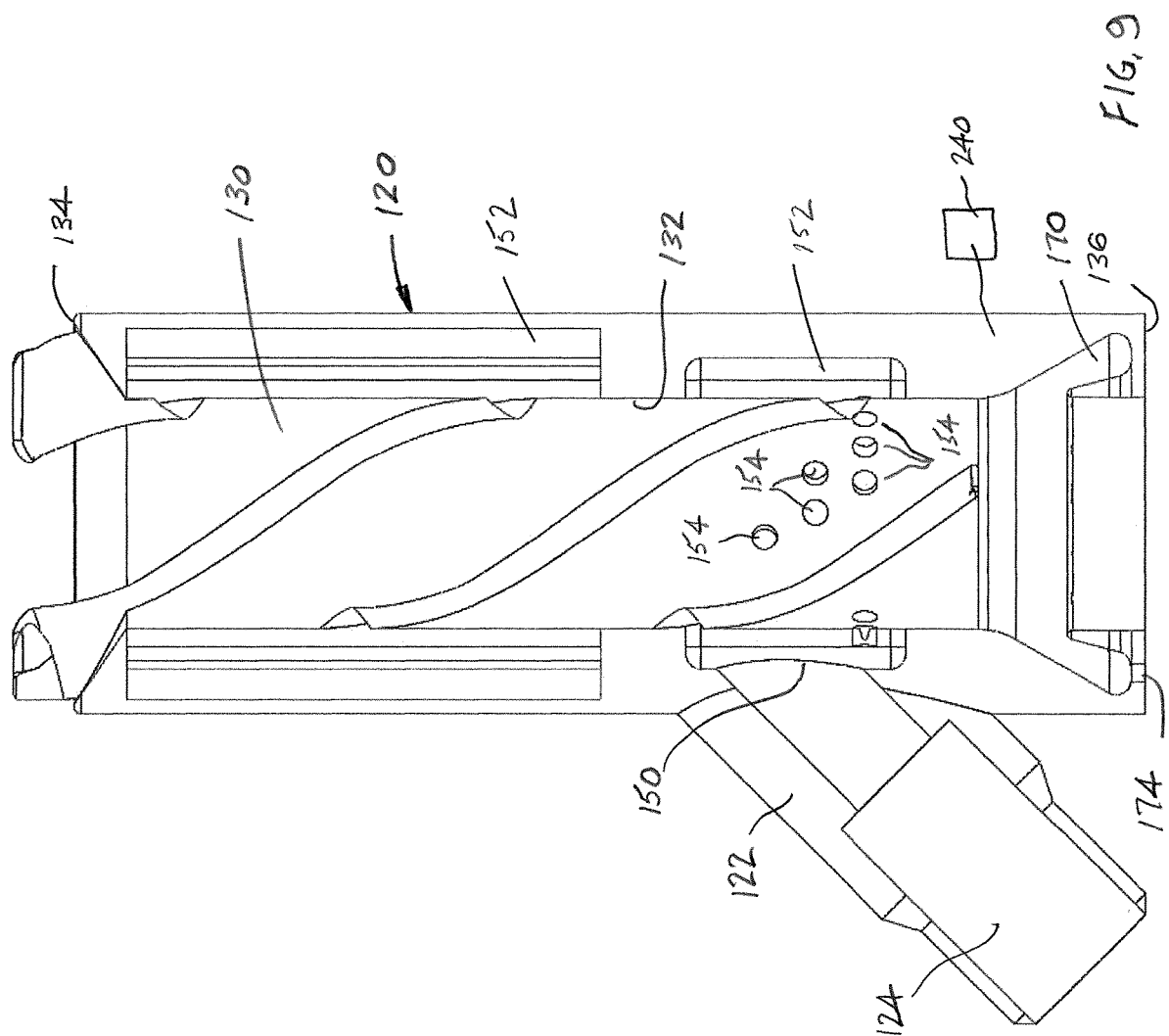
FIG. 9 is a longitudinal cross-sectional view of the turbine of FIG. 3.
Figure 10:
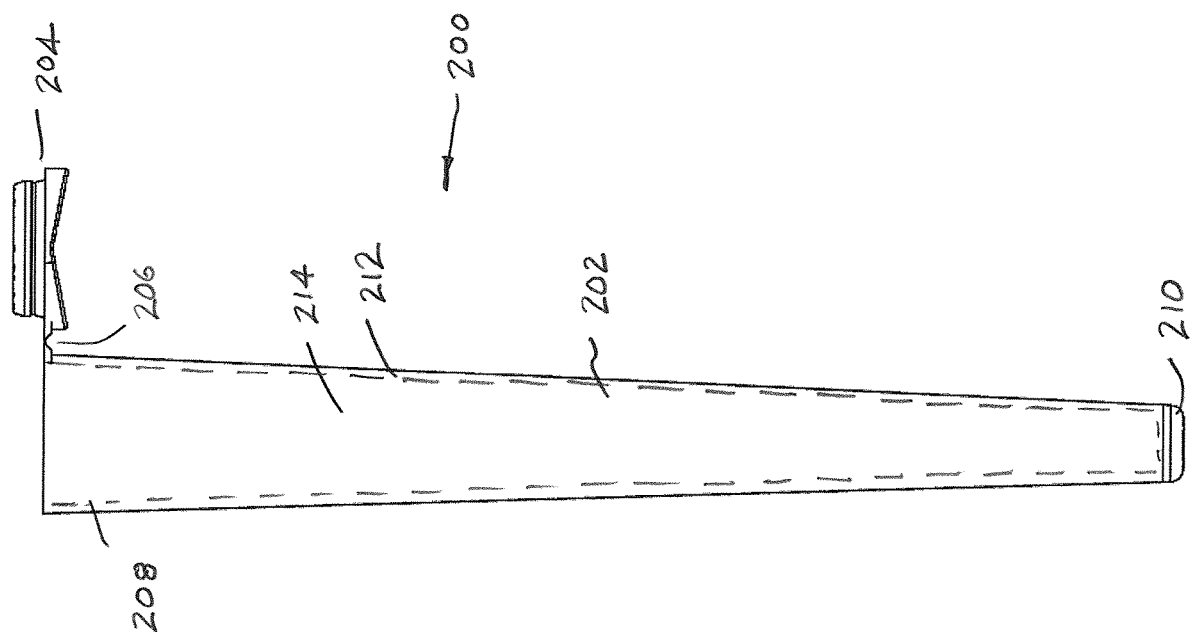
FIG. 10 is an elevational view of a preferred container assembly with a hinged cap in an open position relative to a container body.
Figure 11:
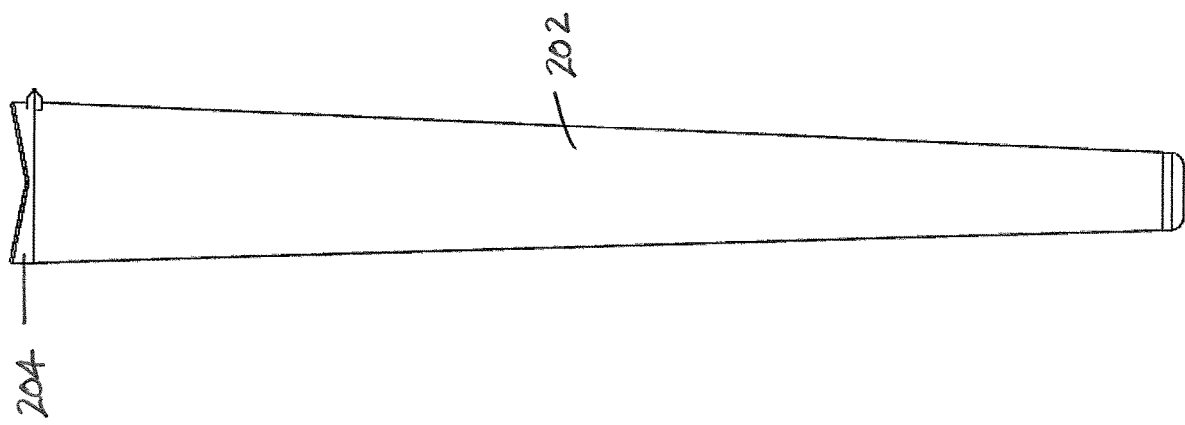
FIG. 11 is an elevational view of the container assembly of FIG. 10 showing the cap in a closed position relative to the container body.

The turbine 120 is generally a hollow cylindrical structure in which the passage 130 extends continuously from the inlet 134 to the outlet 136, and in the preferred arrangement, the passage has substantially the same cross-sectional dimension along the passage. In the preferred arrangement the turbine forms a generally hollow cylinder where the passage has a circular or substantially circular cross-section, although this need not be the particular configuration of the turbine or passage. The internal channel 124 of the turbine attachment portion 122 communicates with the steam generated in and supplied by the steamer housing 102 and directs the steam toward the turbine passage 130. Steam inlet 150 is located adjacent the second end or outlet 136 of the turbine 120 (FIG. 9). The steam inlet 150 directs the steam from the steamer housing 102 (i.e., steam source) along a steam path that communicates with at least a portion of the turbine passage 130. In this particular instance, a cavity 152 is provided in the turbine between inner and outer walls thereof, and since the preferred turbine configuration is a hollow cylinder, the cavity 152 has a generally annular shape although such a shape should not be deemed to be a limiting feature. Thus, the steam elevates the temperature of the turbine, preferably over substantially an entire height of the turbine. Some of the steam passes directly from the inlet 150, to a portion of the cavity 152 and through at least one steam outlet 154, and preferably multiple steam outlets 154 that are located in spaced apart relation around the inner circumferential surface of the wall 132 of the turbine. The steam outlets 154 are preferably located near or adjacent to the second end or outlet 136 of the turbine so that the heated steam rises upwardly through the passage 130 naturally and advantageously toward the first end or inlet 134.

Thus, the steam created in the steamer housing 102 by heating the water in reservoir 108 is directed to internal channel 124 of the attachment portion 122 of the turbine 120. By angling the attachment portion 122 upwardly, the steam naturally rises and migrates toward the steam inlet 150 where a portion enters into annular cavity 152 and another portion of the steam exits into the turbine passage 130 via steam outlets 154. Further, the steam proceeds upwardly due to the heated fluid rising naturally so that the turbine passage 130 has steam continuously supplied thereto.

Some of the steam naturally cools either upon contacting the inner surface of turbine passage 130 or when the steam comes into contact with the associated container assembly and/or associated sleeve (to be described below) as these container assembly components and associated sleeve proceed downwardly from the turbine inlet 134 to the turbine outlet 136. The associated container assembly and sleeve are introduced into the inlet of the turbine and proceed in a first direction (generally vertically downward) toward the outlet and have a temperature less than the temperature of the steam that is rising upwardly in an opposite direction (generally vertically upward). The steam quickly and advantageously raises the temperature of the associated sleeve and the associated container assembly as these components pass downwardly through the rising steam.

In addition, the turbine 120 includes at least one protrusion, and preferably multiple protrusions shown here as multiple, circumferentially spaced, helical protrusions 160 that extend from the inner wall 132 of the turbine and terminate at a radial location within the passage. As illustrated in FIGS. 1-9, each of the helical protrusions 160 preferably has the same pitch. Portions of each helical protrusion 160 may extend axially outwardly from the passage 130 at the upper, first end 134 of the turbine, although this need not necessarily be the case. Similarly, each of the helical protrusions 160 may terminate within the passage 130 adjacent the second end 136 of the turbine 120.

The helical protrusions 160 serve multiple purposes and functions. First, the helical protrusions 160 serve as a portion of a turning member for rotating or twisting an associated container assembly as the container assembly and associated sleeve pass through the passage 130 of the turbine 120. Secondly, the helical protrusions 160 extend radially inward from the surface of the inner wall 132 a sufficient dimension to prevent the associated container assembly and sleeve from contacting the inner wall surface. Third, the helical protrusions serve as ledges or condensate channels to direct condensate (cooled steam) toward a collector ring 170 located adjacent the second end 136 of the turbine 120. As represented in FIG. 2, a return/recirculation line 172 extends from the collector ring 170 (and particularly from an opening 174 in the turbine second end 136 that communicates with the collector ring 170—see FIGS. 7-9). The return/recirculation line 172 communicates with the collector ring at one end and leads to the reservoir 108 in the steamer housing 102 (or other steam source). In this manner, that portion of the steam that turns to condensate along the inner surface of the turbine 120 is returned to the reservoir 108 to be re-heated and sent again as steam into the turbine.

FIGS. 10-16 show various front, rear, side, top, and bottom views of a first preferred embodiment of a container assembly 200, although one skilled in the art will understand from the following description that alternative container assemblies can be used without departing from the scope and intent of the present disclosure. More particularly, the container assembly 200 includes a container or container body 202 and a cap 204. The cap 204 may be a separate component or may be joined to the container 202 via a hinge 206. In the container assembly embodiment 200 of FIGS. 10-16, the container 202 is an elongated structure that is open at a first end 208 and closed at a second end 210. As represented by broken lines in FIG. 10, container wall 212 encloses and forms an internal cavity 214 that is selectively accessed through the open, first end 208. Once the desired product, content, or package material is received in the cavity 214, the cap 204 closes the cavity, i.e., the cap is rotated to a closed position (FIG. 12) to close the contents of the container 202 from the external environment. Typically, the container assembly is a plastic construction, i.e., a molded plastic container assembly where the container 202 and the cap 204 are formed in a single forming operation where connected by a hinge, and may be formed in separate forming operations when not connected by a hinge.

Figure 12:
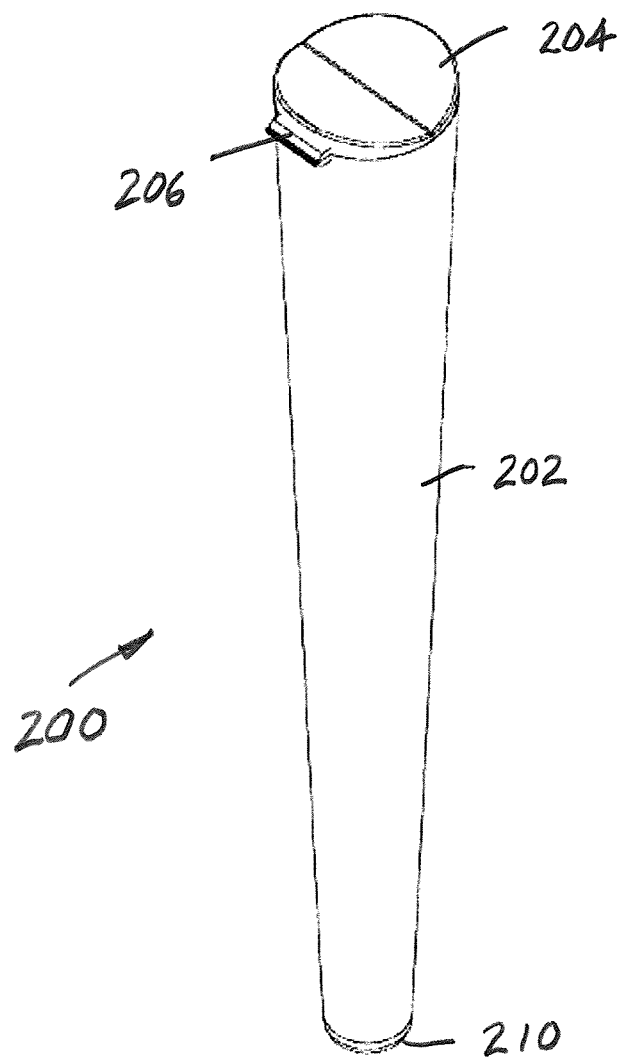
FIGS. 12-15 are other views of the container assembly of FIGS. 10-11.
Figure 13:
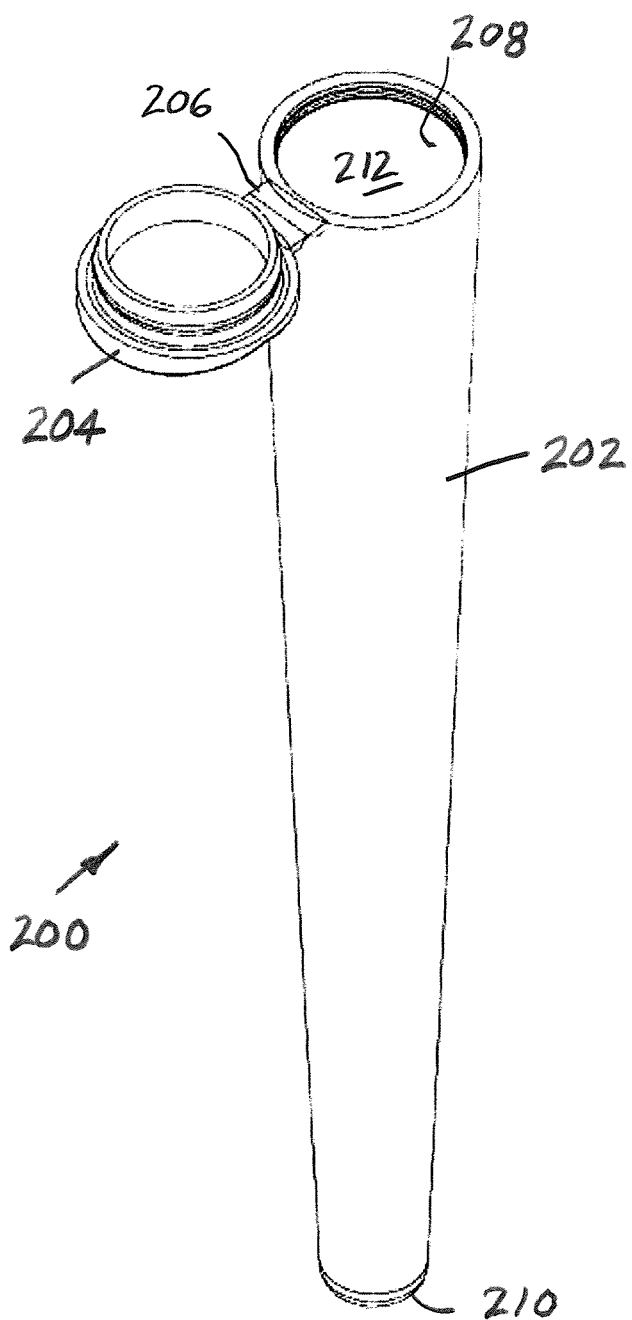
Figure 14:
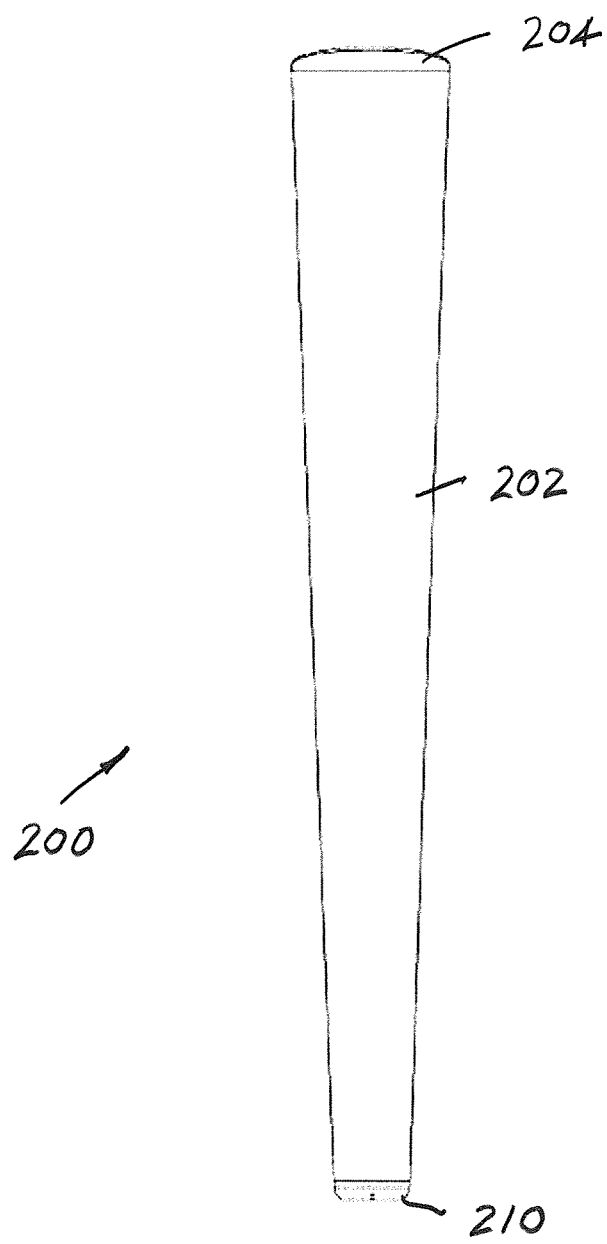
Figure 15:
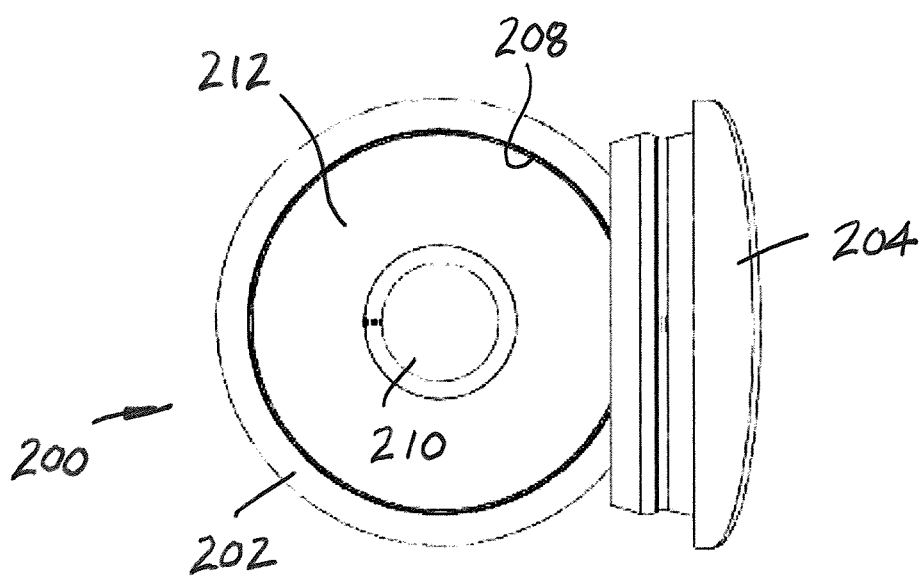

As evident in FIG. 12, with the cap 204 in a closed condition relative to the container 202, the hinge 206 protrudes outwardly from an external surface of the container. This configuration of the hinge 206 is advantageously used to cooperate with one of the helical protrusions 160 in the turbine 120 in the shrink sleeve apparatus. An outer peripheral dimension of the container 200 is less than an inner dimension of the helical protrusions 160 extending into the passage 130. The hinge 206, on the other hand, extends outwardly from the container a sufficient dimension that the hinge contacts one of the helical protrusions 160. Together, the hinge 206 and one of the helical protrusions 160 act as a turning member in order to rotate the container assembly 200 as the container assembly passes via gravity from the upper, first end 134 of the turbine 120 to the lower, second end 136. Of course, it is also contemplated that an alternative component can be provided elsewhere on the container assembly and protrude outwardly for engagement with the turning member/helical protrusions to serve the same purpose as the protruding hinge.

As represented in FIG. 16, a hollow, cylindrical sleeve 220 is dimensioned for receipt over the container assembly 200, typically extending over a major portion of a length of the container assembly. The sleeve 220 is a conventional thin, plastic structure that shrinks when heated to an elevated temperature in a manner well known in the art. As shown in FIG. 16, a first container assembly is identified as container assembly 200A and similarly, the sleeve is identified as sleeve 220A. This represents the container assembly 200A and sleeve 220B before the container assembly and sleeve are joined together in the shrink wrapping process associated with the shrink sleeve apparatus, i.e., the sleeve is positioned over the container assembly has an inner dimension greater than an outer dimension of some or all of the container assembly. On the other hand, a second container assembly is identified as container assembly cap 200B and similarly, the sleeve is identified as sleeve 220B to illustrate the container assembly with a shrink-wrapped sleeve thereon as the assembly exits the shrink wrap apparatus. The heat provided by the steam as the combination container assembly 210 and sleeve 220 pass through the passage 130 shrinks the sleeve into tight fitting peripheral engagement with the container assembly. Preferably the sleeve 220B is received over the container assembly 200B so that the sleeve integrally covers at least a portion of the cap 204B along with a major portion of the container 202B. In this manner, the sleeve 220B also acts as a tamper evident indicator for the final product.

Known steam tunnels work much better than hot air tunnels. Steam is preferred to hot air. Hot air ovens currently used in industry have problems with the container assemblies falling over. Even though hot air ovens can be used and are easier and cheaper to use than related, expensive horizontal steam conveyor units, the hot air ovens require a longer dwell time (i.e., dwell time means the time that the container assembly with its contents is in the oven (at approximately 200 degrees for approximately two to five seconds). Unfortunately, this extended dwell time adversely impacts certain products stored in the container assemblies in certain industries. Heat causes products to expand, melt and stick to the inside of the container assemblies.

While conventional hot air ovens are more compact than bulky horizontal steam conveyor units, it is believed that the steamer apparatus of the present invention will be the smallest shrink sleeve system in the market. Further, the conventional steam conveyor units use on the order of 50-60 gallons of water (along with complex boilers or pressure tanks) in a typical 10-12 hour work shift, while the present invention only uses 5-6 gallons in the same period of time without the need for a boiler or pressure tank structure. The shrink sleeve apparatus of the present invention generates sufficient steam to shrink the sleeve on to the container assembly. The turbine 120 advantageously directs the steam into a 360 degree annulus or doughnut-shaped chamber in the turbine. From there, the steam is introduced through spaced outlets 150 opening into the vertical passage 130. The helical protrusions 160 space the container assembly with the shrink sleeve 220 away from the inner wall 132 of the steam turbine 120. The turbine 120 is preferably oriented upright for the entire process to evenly shrink the sleeve 220 to the container assembly 200. The container assemblies 200 do not easily stand up on their own so that is why the present shrink sleeve apparatus is designed to drop the container assemblies and accompanying sleeves 220 through the vertical steam turbine 120.

An even, constant steam flow passing the container assembly 200 and shrink sleeve 220 is desired so that a uniform shrink is achieved. If not, the resulting product is not aesthetically pleasing, e.g., print on the container assembly may be difficult to read and the container assembly may show wrinkles. The plastic construction of the steam turbine 120 of the present invention advantageously twists the process steam while also twisting or rotating the container assembly/sleeve as they travel in the opposite direction (from the inlet 134 to the outlet 136) than the steam (generally from outlet to inlet). Gravity advantageously pulls the container assembly 200 with the sleeve 220 through the turbine passage 130. The amount of dwell or resident time of the container assembly 200 and sleeve 220 can be controlled by altering the pitch or twist of the helical protrusions 160. The hinge 206 on the container assembly 200 aligns with the helical protrusions 160 of the turbine helix to rotate or twist the container assembly and sleeve 220 on the way down through the turbine passage 130.

While some extremely small and featherweight container assemblies and associated shrink sleeves may get stuck on the way down through the turbine passage 130, a small vibrator 240 (FIG. 9) may be connected to the wall of the plastic steam turbine 120. For example, a small mobile phone-type vibrator 240 could be used to further assure and even speed up the drop of the container assembly 200 and sleeve 220 through the turbine passage 130.

The bottom of the plastic steam turbine 130 includes the condensation collection ring 170. The helical protrusions 160 and the steam chamber wall 132 collect small amounts of condensation. Gravity directs the small amounts of condensation along the protrusions to channel/direct the flow of condensate water into the collection ring 170. From the collection ring 170, the collected water proceeds through a small diameter water return line 172 back to the water reservoir of the steam apparatus. Small amounts of condensation may fall past the collection ring 170 but can be minimized without changing the basic structure and concept described herein.

The plastic turbine 120 with the helical protrusions 160 also allows for uneven diameter container assemblies 200 to be dropped thru the vertical steam turbine passage 130. The protruding hinge 206 of the container assembly 200 acts like a tooth on a gear while twisting the container assembly and sleeve 220, and the engagement between the protruding hinge and the helical protrusion(s) slows the drop at the same time. A greater degree of pitch or twist of the helical protrusions 160 can slow the drop through the turbine passage 130, and likewise less pitch/twist can speed up the drop time through the turbine passage, or to adjust the heat shrinking of the sleeve 220 on to the container assembly 200.

The turbine 120 is advantageously constructed or manufactured through an additive manufacturing process (also referred to as a 3-D printing process) because of the internal cavities formed in the turbine wall 132. Using multiple walls in the turbine construction also desirably insulates and minimizes heat loss, and likewise minimizes the amount of condensation. Plastic material also allows the external surface of the turbine 120 to be at a safer, lower temperature, whereas a similar metal construction would potentially be too hot to touch because the internal temperature of the steam turbine 120 heats to approximately 200 degrees F. The plastic 3-D printed steam turbine 120 can also easily be changed to accommodate different sized (diameters) diameters of container assemblies 200, and likewise machining a comparable turbine from metal would be extremely expensive to accommodate different diameters.

The process of shrink forming the sleeve 220 on the container assembly 200 advantageously includes using a gravity vertical drop of the container assembly and associated sleeve with or without a sidewall helical protrusion 160. The steam turbine 120 can receive different cross-sectional shapes of container assemblies 200, e.g. round patterns, square, rectangular or still other designed container assemblies of various lengths can be dropped through the turbine 120.

FIGS. 17-36 relate to various different embodiments of the container assembly 200, i.e., container 202 and cap 204. For ease of reference and purposes of brevity, each embodiment uses the same reference numerals and description associated with the container assembly 200 of FIGS. 10-15, with an additional suffix "A", "B", etc. Each of these ten additional embodiments illustrates a hinged container assembly where the container/container body is connected by a hinge 206 to the cap 204, with different styles of the container (e.g., cylindrical, tapered, elongated, shorter, etc.) and the different style caps (e.g., flat, V-shaped, dome, donut, etc.). It will also be appreciated that still other designs or variations of the container assembly (either the container body or cap) can be used without departing from the scope and intent of the present disclosure. These different embodiments of the container assemblies are intended to demonstrate that different types of containers can be used with the shrink sleeve apparatus and steam turbine of the present invention. Moreover, it is also contemplated that the container and cap need not be necessarily hinged, although provision of a protruding structure from the container assembly that cooperates with the protrusion in the turbine passage 130 would be required in order to advantageously employ various ones of the features and benefits of the present invention.

Figure 37:
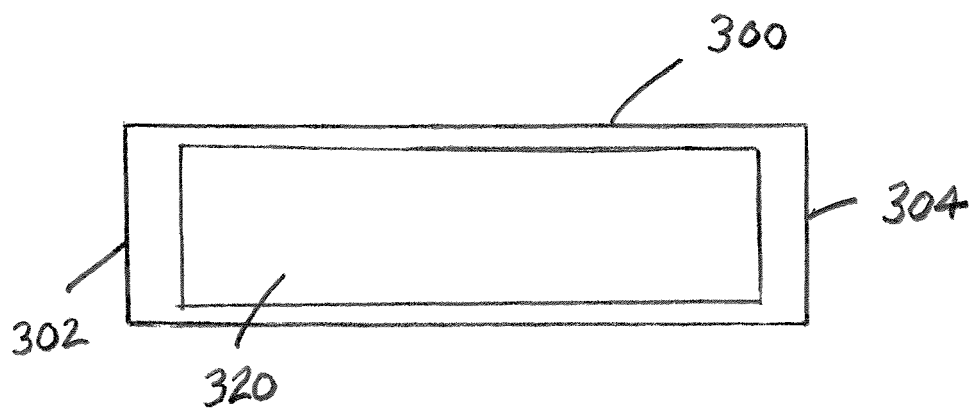
FIGS. 37 and 38 illustrate the sleeve with a printed label secured thereto prior to the shrink wrap process and subsequent to the shrink wrap process, respectively.
Figure 38:
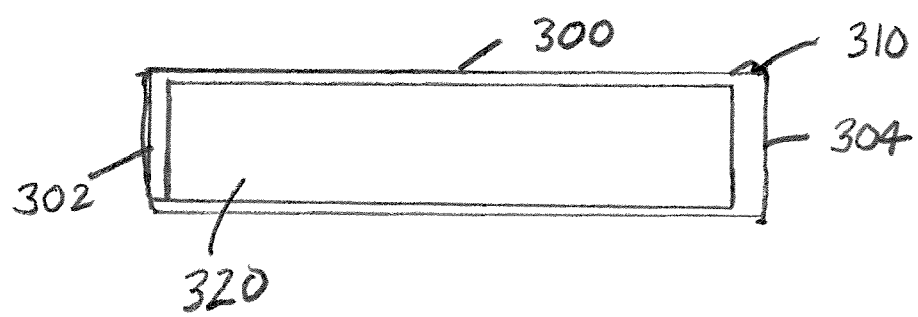

A modified shrink wrap sleeve 300 is shown in FIGS. 37 and 38. In FIG. 37, the sleeve 300 has a first, total surface area (approximately one-half of the total surface area is illustrated in this plan view). The sleeve 300 is shipped in a flattened state but deploys into a generally hollow cylindrical shape that is open at opposite first and second ends 302, 304. Before shrink wrapping, the hollow sleeve 300 has an inner opening dimension adapted to be freely received around the outer surface of a container 310 (FIG. 38). The sleeve 300 is formed of a first material such that, when exposed to an elevated temperature (steam) and subsequently cooled, the inner opening dimension shrinks to a smaller, post-shrink dimension whereby the sleeve inner opening tightly wraps on to the external surface of the container 310.

Reference numeral 320 refers to a print region on the sleeve 300. In a first embodiment, the print region 320 is a white area or pre-printed white area, for example, that is used to print on-the-spot/just-in-time printing such as bar codes, batch information, sale information, compliance information, etc. The sleeve 300 with the just-in-time print on region 320 is then positioned on the container assembly and immediately the sleeve is introduced into the shrink wrapping apparatus where the steam shrinks the sleeve on to the container assembly (e.g., along the interface of the container and cap) and the just-in-time print region remains unaffected. A thermal printer has been successfully used to print on to the region 320 and eliminates the time and cost of printing on a separate label that is described as an alternative arrangement/process below. Providing or printing the white area/region 320 and subsequently printing the print on-the-spot/just-in-time printing such as bar codes, batch information, sale information, compliance information, etc., works effectively without adversely impacting the print quality so that the printed text can be read once the sleeve has been shrink-wrapped onto the container assembly using the quick shrink wrapping apparatus of the present disclosure.

An alternative arrangement/process uses a label 320 that has a second, total surface area less than the first, total surface area of the sleeve 300. That is, the label 320 preferably covers only a portion of the total outer surface of the sleeve 300. The label 320 is secured to an external surface of the sleeve 300 in a manner well known in the art, for example, with a suitable adhesive provided between the label and the outer surface of the sleeve that affixes the label to the sleeve. The label 320 is preferably formed of a second material that is conducive to being printed on, and the label resists shrinkage when exposed to the elevated temperature and subsequently cooled. The adhesive secures the label 320 to the sleeve 300 and the adhesively secured label substantially prevents the sleeve from shrinking when exposed to the steam along that external surface portion of the sleeve that receives the label thereon. That is, a comparison of FIGS. 37 and 38 illustrates that the label 320 has essentially the same dimension before shrink wrapping (FIG. 37) and post shrink wrapping, i.e., after being secured to the container 310 (FIG. 38). The label 320 may include pre-printing and the label may be previously attached to the sleeve 300 and supplied to the shrink wrap steam apparatus. It is also contemplated that additional printing can be added to the label 320 just prior to the shrink wrap process so that last minute information can be included on the label just prior to being shrink wrapped to the container 310. Thus, the overall sleeve 300 will shrink when exposed to the steam but that portion of the sleeve covered by the label and the label itself are essentially immune to shrinkage or a significant amount of shrinkage that would otherwise adversely impact the information/indicia printed on the label. By way of example only, the sleeve and printed label are exposed to the elevated temperature steam for less than 2 seconds, or approximately 1.5 seconds or less (significantly less than prior commercial units of 2-5 seconds).

This written description uses examples to describe the disclosure, including the best mode, and also to enable any person skilled in the art to make and use the disclosure. Other examples that occur to those skilled in the art are intended to be within the scope of the invention if they have structural elements that do not differ from the same concept or that do not differ from the literal language of the claims, or if they include equivalent structural elements with insubstantial differences from the same concept or from the literal language of the claims. Moreover, this disclosure is intended to seek protection for a combination of components and/or steps and a combination of claims as originally presented for examination, as well as seek potential protection for other combinations of components and/or steps and combinations of claims during prosecution.

Although specific advantages have been enumerated above, various embodiments may include some, none, or all of the enumerated advantages. Although exemplary embodiments are illustrated in the figures and description herein, the principles of the present disclosure may be implemented using any number of techniques, whether currently known or not. Moreover, the operations of the system and apparatus as disclosed herein may be performed by more, fewer, or other components, and the methods described herein may include more, fewer, or other steps. Additionally, steps may be performed in any suitable order.

To aid the Patent Office and any readers of this application and any resulting patent in interpreting the claims appended hereto, applicants do not intend any of the appended claims or claim elements to invoke 35 U.S.C. 112(f) means plus function interpretation unless the words "means for" or "step for" are explicitly used in the particular claim.

What is claimed is:

1. An apparatus for shrink wrapping an associated sleeve on an associated container assembly that includes an associated cap and associated container, the apparatus comprising:
    a housing having a wall forming a passage dimensioned to receive the associated container assembly and associated sleeve, the passage having an inlet and an outlet spaced therefrom, and the inlet is located vertically above the outlet such that the associated container assembly and associated sleeve move from the inlet toward the outlet;
    a turning member that includes at least one helical protrusion that extends from the housing into the passage and prevents the associated container assembly from contacting the housing wall and is configured to rotate the associated container assembly relative to both the housing and the turning member as the associated container assembly passes through the passage; and
    a steam path that communicates with the passage to provide steam from an associated steam source to at least a portion of the passage in order to shrink wrap the associated sleeve on the associated container assembly.

2. The apparatus of claim 1 wherein the turning member includes multiple, helical protrusions that extend from the housing wall into the passage and prevents the associated container assembly from contacting the housing wall.

3. An apparatus for shrink wrapping an associated sleeve on an associated container assembly that includes an associated cap and an associated container, the apparatus comprising:
    a housing having a wall forming a passage dimensioned to receive the associated container assembly and associated sleeve, the passage having an inlet and an outlet spaced therefrom, and the inlet is located vertically above the outlet such that the associated container assembly and associated sleeve move from the inlet toward the outlet, the housing including a turning member that rotates the associated container assembly as the associated container assembly passes through the passage, the turning member including at least one helical protrusion that extends from the housing into the passage and prevents the associated container assembly from contacting the housing wall, wherein the at least one helical protrusion is dimensioned to selectively engage an associated hinge extending outwardly from the associated container assembly and thereby rotate the associated container assembly via the associated hinge between the passage inlet and the passage outlet; and
    a steam path that communicates with the passage to provide steam from an associated steam source to at least a portion of the passage in order to shrink wrap the associated sleeve on the associated container assembly.

4. The apparatus of claim 1 wherein the steam path includes a steam inlet that communicates with a chamber in the housing wall that surrounds a perimeter portion of the passage between the passage inlet and the passage outlet.

5. The apparatus of claim 4, wherein the steam path includes multiple, spaced apart steam outlets that communicate with the chamber and extend through the housing wall to the passage.

6. The apparatus of claim 1 further comprising a collector adjacent the passage outlet that directs condensate from the steam to a recirculation line that communicates with the associated steam source.

7. An apparatus for shrink wrapping an associated sleeve on an associated container assembly that includes an associated cap and an associated container, the apparatus comprising:
    a housing having a wall forming a passage dimensioned to receive the associated container assembly and associated sleeve, the passage having an inlet and an outlet spaced therefrom, and the inlet is located vertically above the outlet such that the associated container assembly and associated sleeve move from the inlet toward the outlet;
    a steam path that communicates with the passage to provide steam from an associated steam source to at least a portion of the passage in order to shrink wrap the associated sleeve on the associated container assembly; and
    a vibrator for imparting vibrations to the housing wall.

8. The apparatus of claim 1 wherein the housing is constructed from a polymer material.

9. The apparatus of claim 3 wherein the steam path includes a steam inlet that communicates with a chamber in the housing wall that surrounds a perimeter portion of the passage between the passage inlet and the passage outlet.

10. The apparatus of claim 3 wherein the steam path includes multiple, spaced apart steam outlets that communicate with the chamber and extend through the housing wall to the passage.

11. The apparatus of claim 3 further comprising a collector adjacent the passage outlet that directs condensate from the steam to a recirculation line that communicates with the associated steam source.

12. The apparatus of claim 3 further comprising a vibrator for imparting vibrations to the housing wall.

13. The apparatus of claim 3 wherein the housing is constructed from a polymer material.

14. The apparatus of claim 7 wherein the housing includes a turning member that is configured to rotate the associated container assembly as the associated container assembly passes through the passage.

15. The apparatus of claim 14 wherein the turning member includes at least one helical protrusion dimensioned to selectively engage an associated hinge extending outwardly from the associated container assembly and thereby rotate the associated container assembly via the associated hinge between the passage inlet and the passage outlet.

16. The apparatus of claim 7 wherein the steam path includes a steam inlet that communicates with a chamber in the housing wall that surrounds a perimeter portion of the passage between the passage inlet and the passage outlet.

17. The apparatus of claim 7, wherein the steam path includes multiple, spaced apart steam outlets that communicate with the chamber and extend through the housing wall to the passage.

18. The apparatus of claim 7 further comprising a collector adjacent the passage outlet that directs condensate from the steam to a recirculation line that communicates with the associated steam source.

19. The apparatus of claim 7 further comprising a vibrator for imparting vibrations to the housing wall.

20. The apparatus of claim 7 wherein the housing is constructed from a polymer material.

* * * * *